United States Patent [19]
Shipley et al.

[11] Patent Number: 4,819,159

[45] Date of Patent: Apr. 4, 1989

[54] DISTRIBUTED MULTIPROCESS TRANSACTION PROCESSING SYSTEM AND METHOD

[75] Inventors: Dale L. Shipley, Los Gatos; Joan D. Arnett; William A. Arnett, both of San Jose; Steven D. Baumel, Sunnyvale; Anil Bhavnani, Campbell; Chuenpu J. Chou, Sunnyvale; David L. Nelson, Santa Clara; Maty Soha, Cupertino; David H. Yamada, San Jose, all of Calif.

[73] Assignee: Tolerant Systems, Inc., San Jose, Calif.

[21] Appl. No.: 902,191

[22] Filed: Aug. 29, 1986

[51] Int. Cl.⁴ .............................................. G06F 15/00
[52] U.S. Cl. .......................................... 364/200; 371/9
[58] Field of Search ... 364/200 MS File, 900 MS File, 364/131, 184, 186, 187; 371/11, 12, 13, 25, 67, 68

[56] References Cited

U.S. PATENT DOCUMENTS

| | | | |
|---|---|---|---|
| 4,141,066 | 2/1979 | Keiles | 364/200 |
| 4,228,496 | 10/1980 | Katzman et al. | 364/200 |
| 4,245,306 | 1/1981 | Besemer et al. | 364/200 |
| 4,358,823 | 11/1982 | McDonald et al. | 364/200 |
| 4,480,304 | 10/1986 | Carr et al. | 364/200 |
| 4,577,272 | 3/1986 | Ballew et al. | 364/200 |
| 4,628,508 | 12/1986 | Sager et al. | 371/9 |
| 4,751,702 | 6/1988 | Beier et al. | 371/9 |

*Primary Examiner*—Gareth D. Shaw
*Assistant Examiner*—Jonathan C. Fairbanks
*Attorney, Agent, or Firm*—A. C. Smith

[57] ABSTRACT

The method and means of fault-tolerant processing includes a plurality of system building blocks, each including a real-time processor and specialized processors and local non-volatile memory that are coupled to communicate internally within each of the system building blocks, which, in turn, communicate with one another over local-area network links, and communicate with the remainder of the system over an I/O bus controlled by an I/O processor. Transaction-based processing is under control of a transaction coordinator which permits all of the transaction operations to complete successfully and then alter stored data for the completed transaction, or not to alter any stored data if a transaction is not completed. The transaction coordinator maintains a record of the distributed file accesses required during processing of a transaction, and prevents other transactions from altering stored data during processing of a transaction.

6 Claims, 16 Drawing Sheets

TWO SBB'S CONFIGURATION

TWO SBB'S CONFIGURATION

READ ONLY FILE

READ ONLY FILE

READ (BUT NOT READ ONLY); WRITE; O-CONTROL READ/WRITE - FILES

DISTRIBUTED MULTIPROCESS TRANSACTION PROCESSING SYSTEM AND METHOD

FIELD OF THE INVENTION

The present application relates to multiprocessing computer systems, and particularly relates to distributed fault tolerant on-line transaction processing computer systems.

BACKGROUND OF THE INVENTION

Multiprocessing systems have been known for some time. Various types of multiprocessing systems exist, including parallel processing systems and a variety of forms of computing systems designed for on-line transaction processing.

On-line transaction processing is generally contrasted with batch processing and real time processing. Batch processing involves queueing up a plurality of jobs with each job serially begun after completion of the prior job and completed prior to beginning the next job, with virtually no interaction with the user during processing. If access to a data base was required, the data base was loaded and unloaded with the job. The elapsed time between placing the job in the queue and receiving a response could vary widely, but in most instances took more than a few minutes so that a user could not reasonably input the job and wait for a response without doing intervening work. Until the late 1970's most commercial computer system architectures were intended primarily for batch processing. Batch processing systems have found particular application in scientific applications.

Real time processing systems represent a small share of the commercial market, and are used primarily in manufacturing applications where a stimulus or request must be acted on extremely quickly, such as in milliseconds. Typical applications for real time processing systems involve process control for monitoring and controlling highly automated chemical or manufacturing processes.

On-line transaction processing systems, on the other hand, frequently involve large databases and far greater interaction with a plurality of individuals, each typically operating a terminal and each using the system to perform some function, such as updating the database, as part of a larger task and requiring a predictable response within an acceptable time. On-line transaction processing systems typically involve large data bases, large volumes of daily on-line updates, and extensive terminal handling facilities. Frequently in on-line transaction processing systems only the current version of a database will be contained within the system, without paper backup.

Computer system architectures designed specifically for on-line transaction processing were introduced in the late 1970's, although more conventional batch systems are frequently offered in non-batch configurations for use in the on-line transaction processing. Over time, on-line transaction processing has come to impose several requirements on the processing system. Those requirements include substantially continuous availability of the system, expandability (usually in a modular form), data integrity even in the event of a component failure, and ease of use.

The requirements for substantially continuous availability of the system and data integrity, taken together, are generally referred to as "fault tolerance". A commercially acceptable on-line transaction processing system must therefore offer, as one of its attributes, fault tolerance. However, the term fault tolerance may still be the subject of confusion since it can apply to both hardware and software, hardware only, or software only; in addition, fault tolerance can mean tolerance to only one component failure, or to multiple component failures. In the current state of the art, fault tolerance is generally taken to mean the ability to survive the failure of a single hardware component, or "single hardware fault tolerance".

It may be readily appreciated that fault tolerance could not be provided in a single processor system, since failure of the processor would equate to failure of the whole system. As a result, fault tolerant systems involve multiple processors. However, not all fault tolerant systems need be suited to on-line transaction processing.

Fault tolerant multiprocessor systems range from so-called "cold", "warm" and "hot" backup systems to distributed, concurrent on-line transaction processing systems such as described in U.S. Pat. No. 4,228,496. Cold, warm and hot backup systems are used primarily with batch processing systems, and involve having a primary computer performing the desired tasks with a second computer at varying stages of utilization. When the primary computer fails, the system operator performs a varying range of steps and transfers the task formerly performed on the failed primary system onto the substantially idle backup system. This form of fault tolerant design was usually prohibitively expensive, offered little protection against data corruption, and presented generally unacceptable delays for on-line use.

Fault tolerant distributed processing systems have included systems using a lock-stepped redundant hardware approach initially developed for military and aerospace applications and currently marketed, in a somewhat modified form, by Stratus Computer, as well as those using a combination of hardware and software to achieve fault tolerance, such as described in the aforementioned '496 patent. Another approach using a combination of hardware and software to achieve fault tolerance was formerly marketed by Synapse Computer, and involved providing a single additional processor as a hot backup for all other processors in the multiprocessor system.

The redundant hardware approach suffers from a number of limitations, including particularly difficulties in maintaining the requisite tightly couple relationship between the various system elements, and limitations in software development and flexibility.

While the system described in U.S. Pat. No. 4,228,496 provided many improvements in the field of distributed fault tolerant computing, that system also suffers from limitations relating to the overhead required for handling of transaction-based operations. With regard to the overhead required for handling transactions, the system described in the '496 patent appears to require continued communications between primary and backup processors to ensure that the status of the transaction at key stages, called checkpoints, is communicated from the primary to the backup processor. This relatively continuous checkpointing imposes an undesirable overhead requirement. Moreover, depending upon the application being run by the system, the overhead requirement can become an extreme burden on the system.

The system described in the '496 patent also suffers from the limitation of requiring applications programs to be compatible with or written for specially developed software. Such specially developed software in many instances requires programmers to learn new programming languages and unnecessarily limits the ease with which applications can be developed for or ported to the system. It has become well recognized that one of the major stumbling blocks to use of more efficient systems for transaction processing has been the cost of rewriting the customer's application programs for use on a fault tolerant transaction processing system, and these costs are greatly magnified when learning of an entirely new language is required.

As a result, there has been a need for a distributed multiprocessing system capable of fault tolerant operation with simplified handling of transaction based operations.

Thus, there has also been a need for a loosely coupled distributed multiprocessing system capable of fault tolerant operation using conventional operating systems.

SUMMARY OF THE INVENTION

The present invention substantially resolves many of the aforementioned limitations of the prior art by providing a distributed, multiprocess on-line transaction processing system which employs multiple concurrent processors communicating by conventional LAN links and based on the UNIX operating systems modified for multiprocessor operation.

Fault tolerance is provided by the distributed processing architecture of both the hardware and the software, including multiported disks and related devices, unique and moveable message queues, distributed system rendezvous, extent based file allocation, and kernel based transaction processing, among others which will be more greatly appreciated from the detailed description provided hereinafter.

The hardware architecture of the current system is based on the National 32000 chip set, and utilizes a plurality of system building blocks (SBBs) each comprising a real time processor, a user processor, an I/O processor and a system interconnect board (SIB) and local memory. The specialized processors, the SIB and the memory communicate internally within the SBB by means of an internal mainframe bus.

The SBBs communicate with one another over LAN links such as Ethernet, and communicate with the remainder of the system over the I/O bus controlled by the I/O processor.

The system is transaction based, so that each transaction is treated atomically and requires no unusual management or overhead. Checkpointing is eliminated.

For purposes of the present invention, a transaction is defined as a sequence of operations that execute atomically, such that either all of the operations execute successfully, or none of the operations are permitted to alter the stored data. The atomicity of transactions is ensured by establishing a transaction coordinator, which maintains a record, or log, of the distributed file accesses required during processing of the transaction, combined with file and block level locks to prevent other transactions from altering the data at inappropriate times during processing.

In most cases, the transaction completes, at which time the files or blocks read or updated by the transaction are released to be used by other transactions. If a transaction aborts, the transaction coordinator causes all data files that the transaction changed to revert to the state they were in at the time the transaction began. During processing of a transaction, a consistent view of all required files is maintained; that is, no required file may be changed by any other activity in the system until the transaction has either completed or aborted. In the event the SBB having the transaction coordinator fails, the coordinator migrates to another SBB and a consistent view of the data is again restored by restoring the data to its state prior to the beginning of the last transaction, and notifies the process' signal handler with a SIGABORT signal and code. The process may then restart the process if desired. Restarting of the coordinator occurs automatically. In this manner continuous availability of the system and the data is provided.

Because no unusual languages are required, complete rewriting of user programs is not required, providing significantly improved portability of applications to the fault tolerant environment.

Improved throughput is provided by, among other things, the use of interprocess communications channels which permit I/O operations to be localized to the SBB associated with the disk owning the data, independently of the location of the requesting SSB, rather than requiring each I/O to be managed from the requesting SBB.

It is therefore one object of the present invention to provide an improved multiprocessor system.

It is another object of the present invention to provide a concurrent distributed multiprocessing system which is transaction based.

It is yet another object of the present invention to provide a concurrent distributed multiprocessing system which is fault tolerant.

It is still another object of the present invention to provide a multiprocessing system which uses a conventional and readily transportable operating system such as UNIX.

It is a further object of the present invention to provide a distributed, fault tolerant multiprocessing system in which interprocessor communications are managed as portions of a local area network, such as through Ethernet links.

It is a still further object of the present invention to provide a multiprocessor system which can be automatically and dynamically balanced.

It is yet a further object of the present invention to provide a fault tolerant multiprocessor system in which message queues related to a logical data volume can be moved and reopened to provide access to the data in the event of a processing failure.

These and other objects of the present invention can be better appreciated from the following detailed description of the present invention, when taken in light of the accompanying drawings.

DETAILED DESCRIPTION OF THE INVENTION

Figure 1:
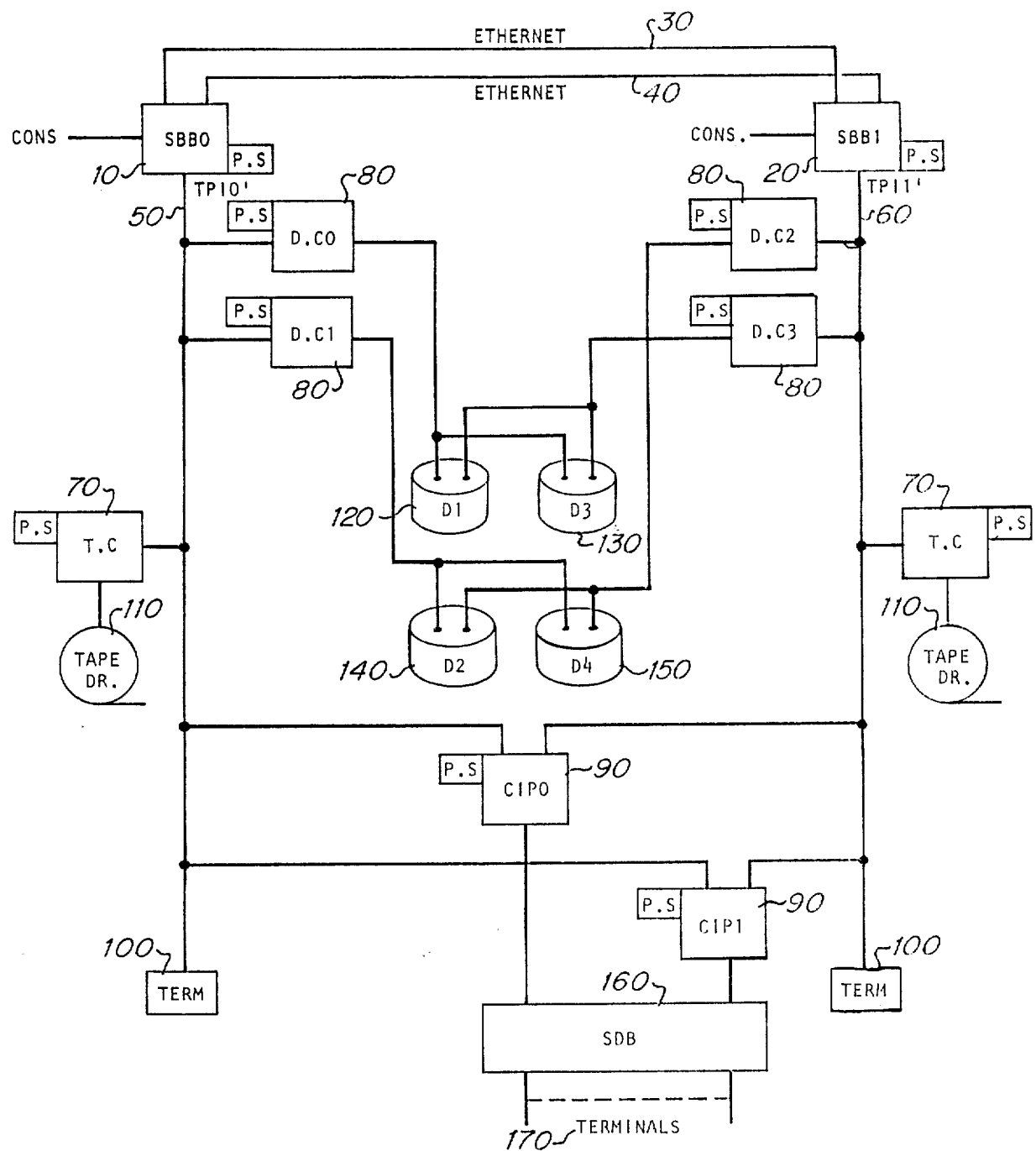
FIG. 1 is a schematic block diagram showing in functional block diagram form a two processor (SBB0 and SBB1) arrangement of the multiprocessor system according to the present invention.

Referring first to FIG. 1, the general hardware architecture of the system of the present invention can be better appreciated. FIG. 1 illustrates in block diagram form a two processor module embodiment. First and second processor modules, or SBBs, 10 and 20. The SBBs 10 and 20 are interconnected by dual local area network (LAN) links 30 and 40, which may for example be Ethernet links, fiber optics cables, or other suitable communications channel.

Each of the SBBs 10 and 20 communicate through I/O channels or buses 50 and 60, respectively, with various forms of peripherals controllers, including tape controllers 70, disk controllers (DC) 80, and communications interface processors, or communications interfaces, 90. Each I/O channel is terminated with a channel terminator 100. As will be better appreciated from FIG. 2, a single SBB may have either one or two I/O channels. The SBBs 10 and 20 and the various controllers 70, 80 and 90 are each provided with a local power supply (ps).

The tape controllers, which may be single ported, are associated with at least one tape drive 110. Likewise, the disk controllers 80 are each single ported, although the associated disk drives 120, 130, 140 and 150 are preferably dual ported and accessible from two SBBs. Each disk is "owned" by only a single SBB, and that disk may only be addressed by that SBB for so long as the SBB retains ownership. Ownership is maintained by the owner SBB regularly updating a timestamp in a status sector of the disk, which is also regularly checked by the volume manager (associated with the operating system, as discussed hereinafter) of the non-owning SBB. If the owner SBB fails, the volume manager of a non-owning SBB will observe the outdated timestamp and assert ownership of the disk.

Typically, timestamps are applied to disks periodically and whenever an action occurs which could affect data consistency. As will be understood by those skilled in the art, the disks may be operated in a mirrored configuration, or may be operated without a mirroring backup. Additional disks may be added to the system during operation.

Each of the two communications interfaces 90 shown in FIG. 1 in turn communicates with a System Distribution Board, or SDB 160, to which one or more terminals 170 may be connected. Printers and other similar output devices may be connected to the communications interface 90. Additional communications interfaces 90 may be added to the system when the system is operating by providing updated configuration information to the system and initializing the communications interface.

It will be appreciated that, while FIG. 1 shows a two SBB embodiment, the configuration of FIG. 1 could be expanded to permit communication between a number of SBBs limited only by the characteristics of the LAN links 30 and 40. In such an arrangement, the additional SBBs may be added to the system by simply identifying the additional SBBs to the SIBs in the system, extending the LAN links 30 and 40 to the additional SBBs, and by adding appropriate disk controllers and disks to permit storage of and access to the necessary files. The additional SBBs may be identified to the SIBs prior to system start-up, or may be identified to the SIBs serially while the system is operating. In addition, failed SBBs can be removed from the system and restarted without taking the system down, providing a simple and effective form of modular expandability.

In such an arrangement, the disk controllers will preferably be shared, in at least some instances, between the SBBs 10 and 20 and the additional SBBs to provide balanced loading and better access in the event of failure. In addition, while FIG. 1 describes an implementation using dual Ethernet cables, other forms of local area networking such as fiber optics will also provide suitable, and in some cases improved, performance.

Figure 2:
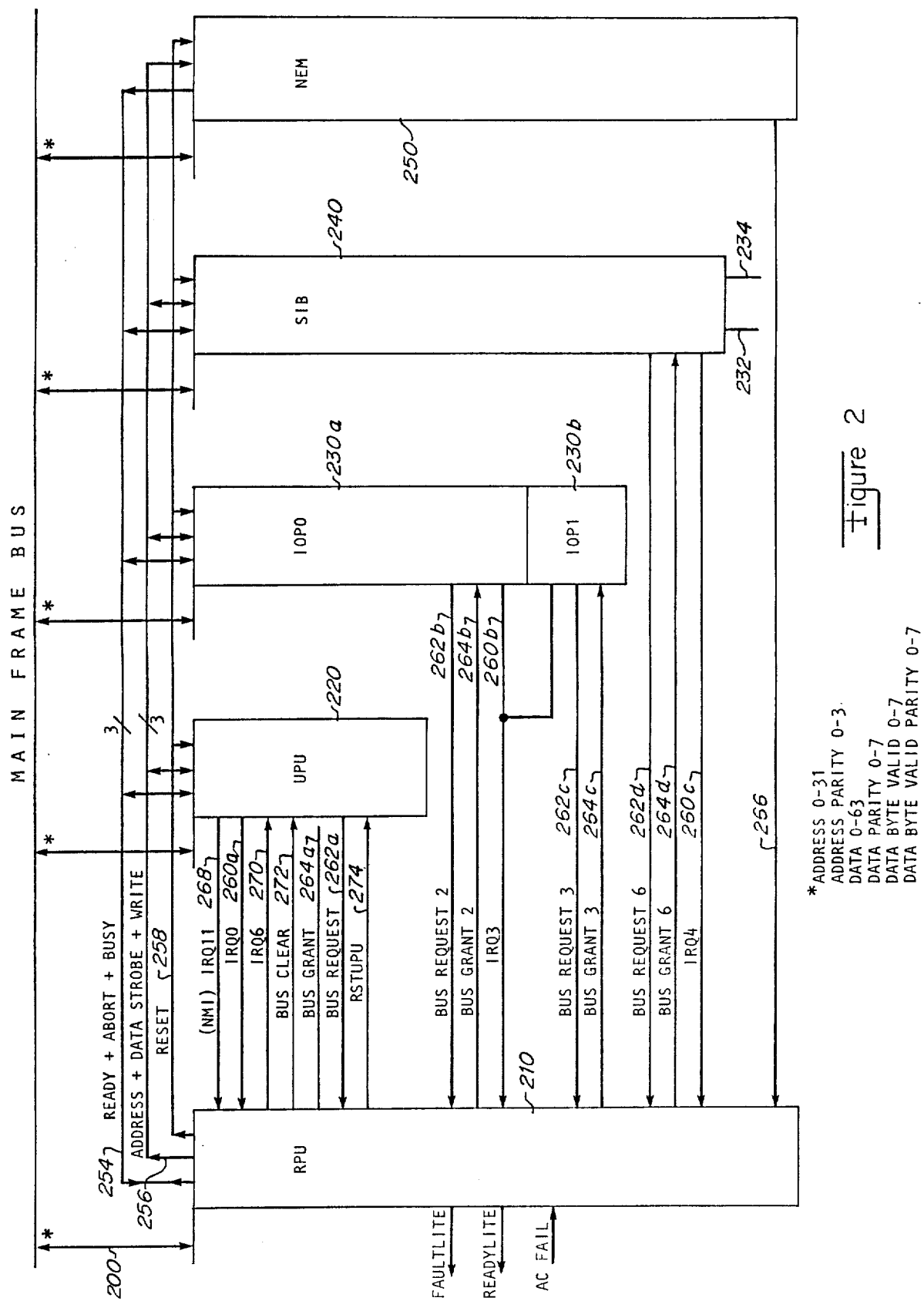
FIG. 2 shows in schematic block diagram form the elements of a System Building Block, hereinafter referred to as an SBB.

Referring now to FIG. 2, the configuration of the SBBs 10 and 20 can be better appreciated. Each SBB is comprised of a plurality of special purpose processors and related logic which communicate through a Mainframe Bus, or MFB 200. In one embodiment, the MFB 200 is a 64 bit data bus.

The special purpose processors and related logic which comprise the SBB 10 includes a Real Time Processor Unit (RPU) 210, a User Processor Unit (UPU) 220, I/O Processors (IOP) 230a and 230b, and System Interconnect Board (SIB) 240, and Memory (MEM) 250. As can be seen from FIG. 2, the RPU 210 provides the primary control for access to the MFB 200, and thus communicates with each other module which forms the SBB by means of one or more lines. Although these lines are shown separately from the MFB 200, in fact each of the lines between the modules which form the SBB are part of the MFB 200, and are shown separately only for purposes of clarity. The lines included in the MFB 200, but not separately shown in FIG. 2, are address lines (0-31), address parity lines (0-2), data lines (0-63), data parity (0-7), data byte valid (0-7), and data byte valid parity bit. It will also be appreciated, both in FIG. 2 and throughout the remaining FIGS. discussed herein, that numerous detailed control signals have been eliminated to avoid obscuring the present invention in details which will be apparent to those of ordinary skill in the art, given the teachings herein.

The RPU 210 communicates with each of the other modules in the SBB by means of some lines which go to each of the other modules, and other lines which run uniquely to one of the other modules. Lines which run to each of the other modules include bidirectional ready, abort and busy lines 254a-c, two bidirectional lines 256a-b for sending address and data strobes and write signals, and a reset line 258 extending from the RPU 210 to each of the other modules. The RPU 210 is the first module in the SBB to initialize on system reset, and in turn sets each of the other SBB modules to a known state.

Lines which run uniquely from the RPU 210 to the remaining Specialized processor modules, the UPU 220, the IOP's 230a-b and the SIB 240, include interrupt request lines 260a-c from the other modules to the RPU 210, bus request lines 262a—d from the other modules to the RPU, and bus grant lines 264a-d from the RPU 210 to the other modules. It should be noted that both IOPs use only one interrupt line 260b with the operating system left to determine which IOP has actually made the request. Also, each IOP 230 has a unique bus request line 262 and bus grant line 264. The memory 250 communicates with the remainder of the system primarily over the MFB 200 as necessary, but may send an interrupt request directly to the RPU 210 over interrupt request line 266.

As will be appreciated from the discussion hereinafter, the UPU 220 maintains most frequent access to the MFB 200, and therefore the RPU 210 includes additional lines to better facilitate the frequent communications which occur between the RPU 210 and the UPU 220. These additional lines include a non maskable interrupt request line 268 from the UPU 220 to the RPU 210, an interrupt request line 270 from the RPU 210 to the UPU 220, a bus clear line 272 from the RPU 210 to the UPU 220, and a reset UPU line 274 from the RPU 210 and separate from the general reset line 258.

As will be better appreciated hereinafter, the purpose of the UPU 220 is, in general, to execute user level software in the SBB, and the UU includes cache storage for software executing on the UPU. The IOPs 230a-b generally control communication between the peripherals and the SBBs, including interrupts, arbitration and data transfer. Included in such functions is the processing of a channel program built by the RPU 210 in the MEM 250. As shown partially in FIG. 1, the I/O channels or buses 50 and 60 and associated controllers 70, 80 or 90 communicate with the SBB through the IOPs 230a-b. While two IOPs are shown in FIG. 2, the system may be configured to have one or more IOPs.

The SIB 240 controls communications between processors, including providing a dual ported Ethernet or other LAN interface to accommodate the dual Ethernet or other LAN cables 30 and 40. In one embodiment, the size of the memory 250 can range from 4 to 12 megabytes of solid state RAM of a generally conventional design.

Figure 3:
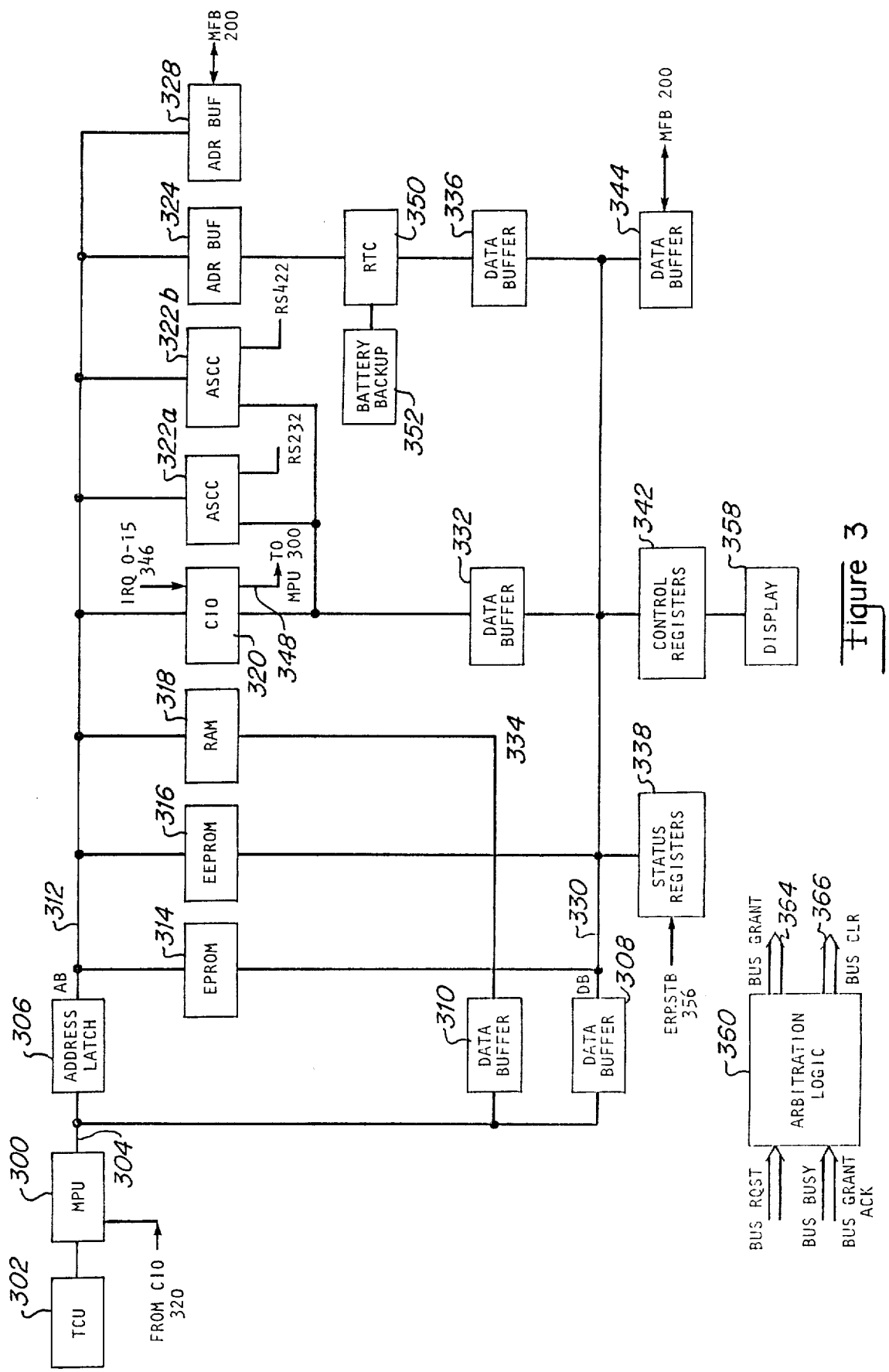
FIG. 3 shows in schematic block diagram form the Real Time Processor Unit (RPU), of the SBB.
Figure 4A:
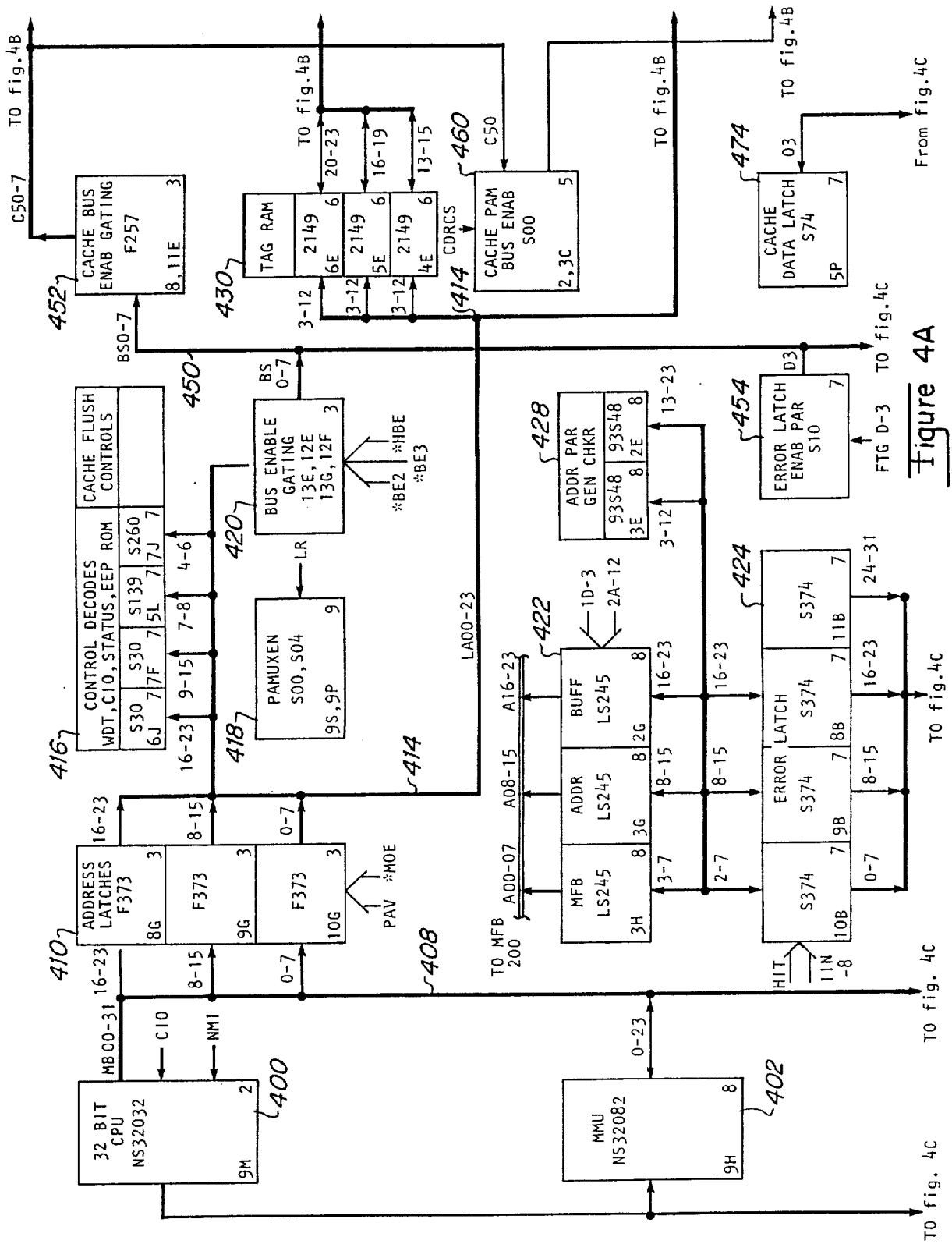
FIG. 4 and 4a, 4b, 4c, 4d show in schematic block diagram form the User Processing Unit (UPU) of the SBB.
Figure 4B:
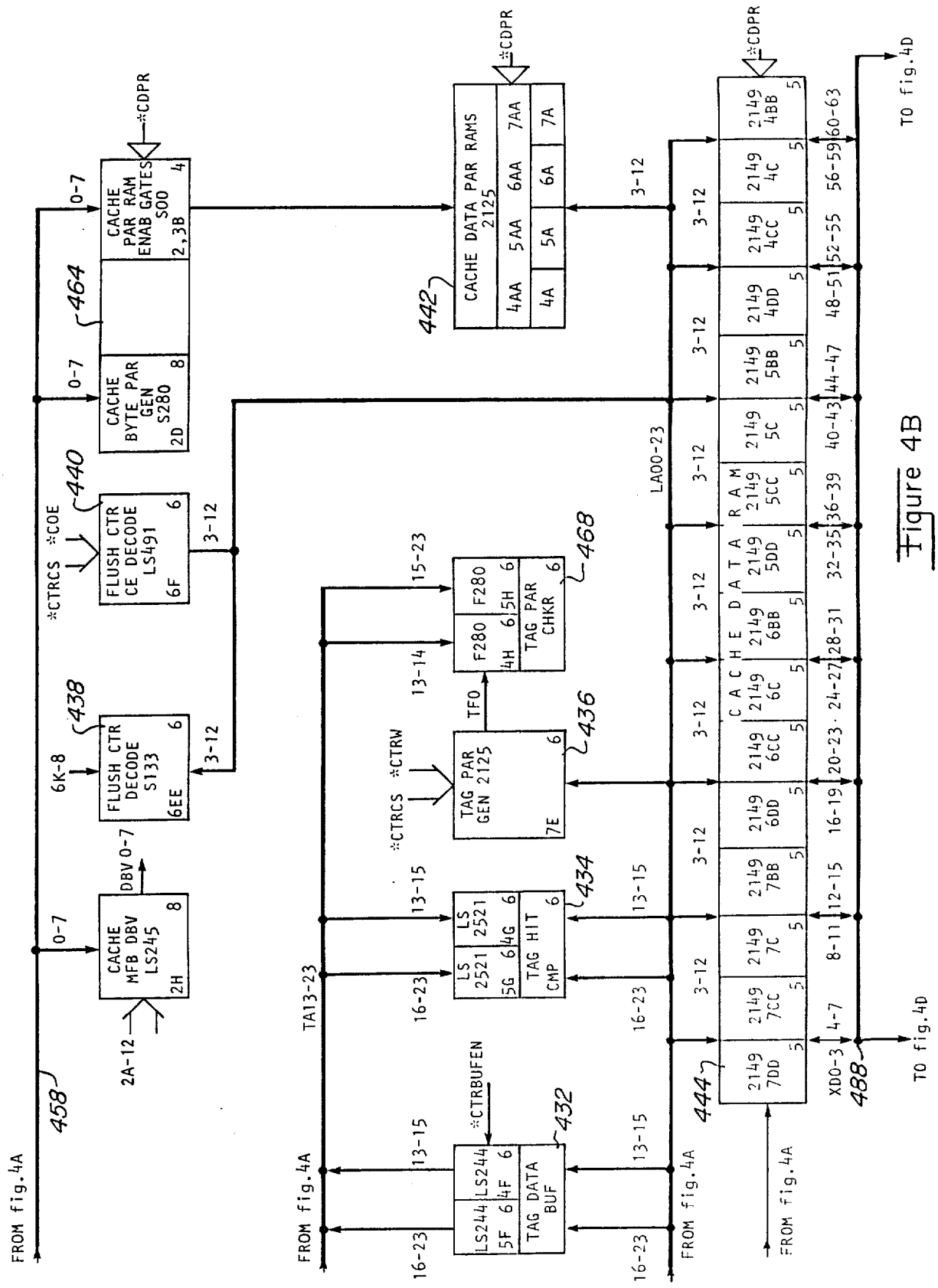
Figure 4C:
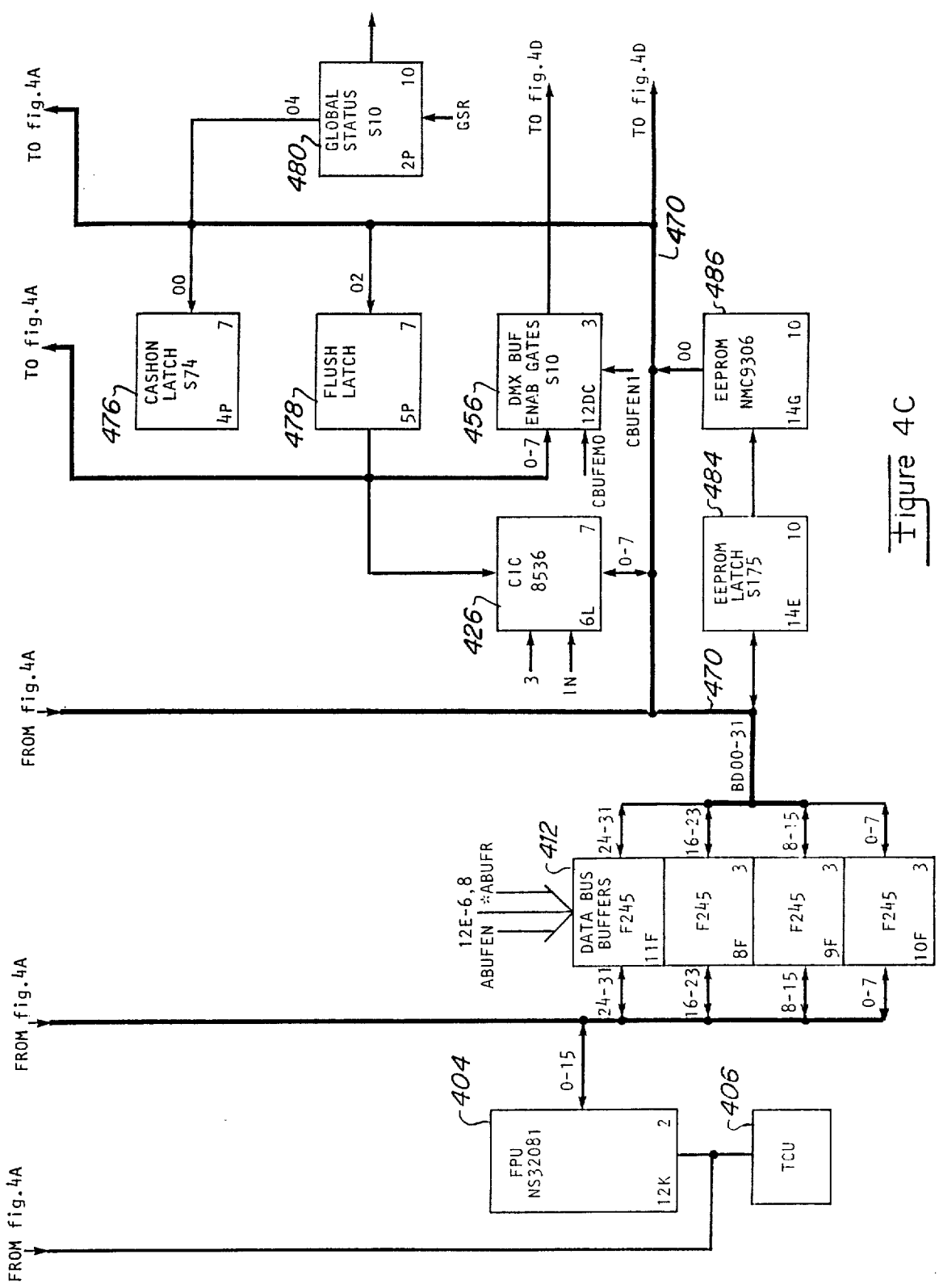
Figure 4D:
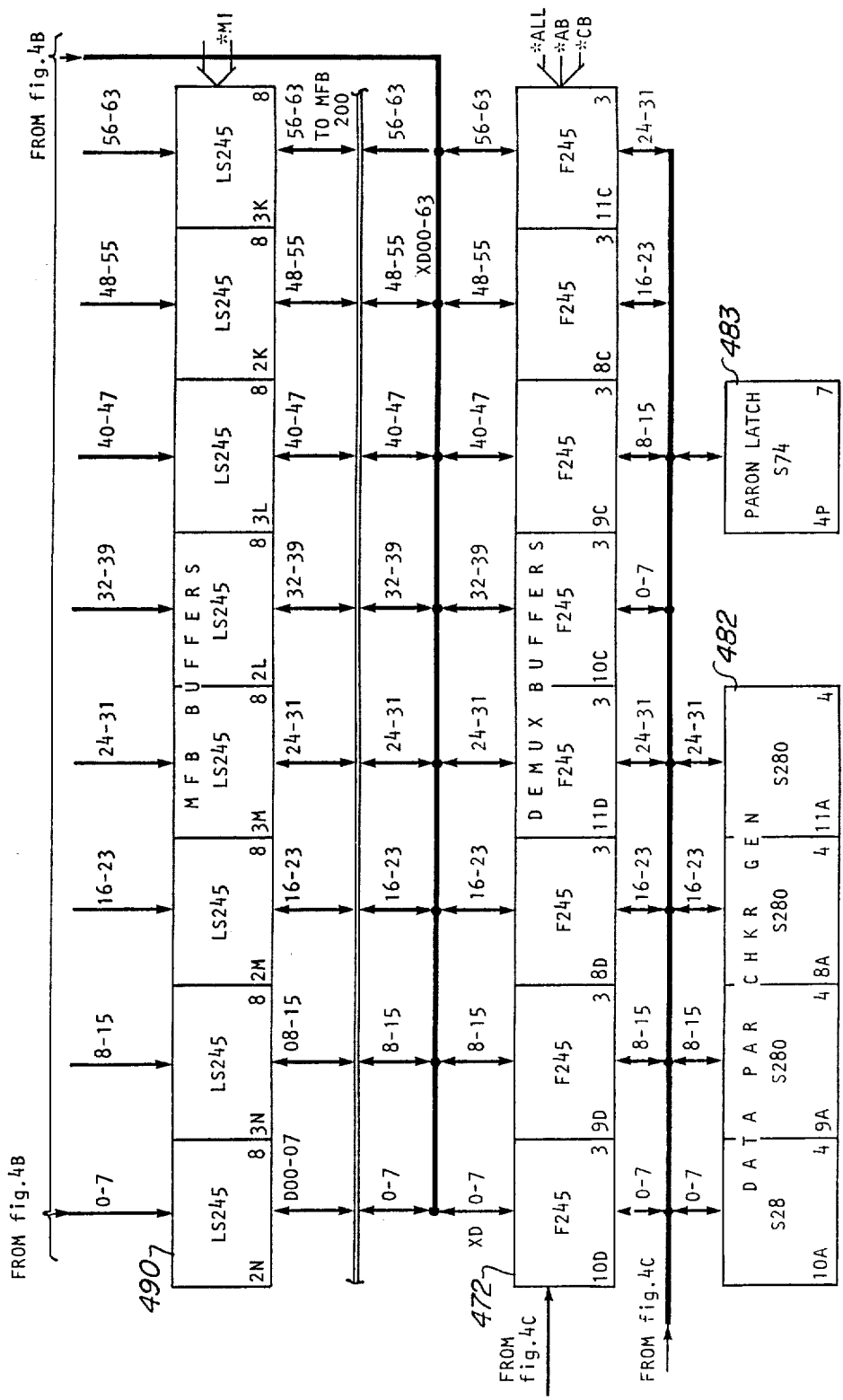

Referring now to FIG. 3, the RPU 210 can be better appreciated. A microprocessor (MPU) 300, which may for example be a 32032 such as is commercially available from National Semiconductor (or in some embodiments a 32016 processor available from the same vendor), receives timing control signals from a timing control unit (TCU) 302. The TCU 302 may be a 32201 chip, also available from National.

The MPU 300 provides and receives address and data information on a main bus 304 in a conventional manner. The main bus 304 then communicates address information through an address latch 306, and provides and receives data through a pair of data buffers 308 and 310. The address latch 306 provides address information via a bidirectional address bus 312 to an EPROM array 314, an EEPROM array 316, local RAM 318, and an interrupt control circuit (CIO) 320, as well as one or more asynchronous communications controllers (ASCCs) 322a-b. In addition, the address bus 312 communicates with an real time clock (RTC) address buffer 326 and an MFB address buffer 328.

The data buffer 308 communicates data via a first bidirectional data bus 330 with the EPROM array 314, and the EEPROM array 316; it also communicates data, via a secondary data buffer 332, with the CIO 320 and the ASCCs 322a-b. In addition, the first data bus 330 communicates with an RTC data buffer 336, error status registers 338, a diagnostics data buffer, control registers 32, and an MFB data buffer 344. The data buffer 310 communicates with the RAM 318 via a second data bus 334.

The EPROM array 314, which may vary greatly in size but typically is on the order of 512K bytes, stores the firmware for the RPU. The EEPROM array 316, which typically is on the order of 2k bytes, stores identification for the SBB, system and network, and also stores diagnostic related information. The RAM 318, which is typically parity protected, may be on the order of one megabyte. The CIO 320, which may for example be an 8536 chip as commercially available from Zilog or AMD, receives a plurality of interrupt request inputs 346 in addition to connections to the bus 312 and buffer 332, and sends an interrupt signal to the MPU 300 by means of an interrupt output 348. The ASCCs 322a and 322b may be, for example, an 8531 chip available from Zilog and other manufacturers, or may be any of several other types; but typically will provide an output compatible with a desired communications protocol, such as RS232 or RS422 as examples.

The RTC address buffer 324 communicates with a real time clock (RTC) 350, which in turn communicates on the data side with RTC data buffer 336. The RTC 350 is provided with a battery back-up 352 to ensure continued operation during system outages. Lastly on the address bus side, the MFB Address Buffer 328 communicates bidirectionally with the MFB 200.

On the data bus side, the data buffer receives input from a switch bank, which permits the RPU to be forced to specific states during diagnostics. The status registers 338 receive an error strobe input 356 from error logic, which detects bus timeout, bad parity and bus abort signals from the remainder of the system. The control register 342 asserts control bits to be used on and off board. On board uses of the control bits may include a status display 358, which may for example comprise LEDs, indicator lights, or so on. Off board uses include fault and ready LED arrays. Lastly, the MFB data buffers 344 communicate data with the MFB 200.

In addition to the elements of the RPU previously described, the RPU also includes MFB arbitration logic 360, which may for example be a 68452 chip as available from Motorola; the arbitration logic 360 is otherwise not connected to the remainder of the RPU except to receive bus requests from the RPU and to provide bus grants as appropriate. The arbitration logic 360 receives bus requests from the elements of the SBB capable of making such a request, and also receives a bus busy signal. When appropriate in response to bus requests, the arbitration logic 360 provides a bus granted output on line 364 and a bus clear signal on line 366.

Figures 4, 5A:
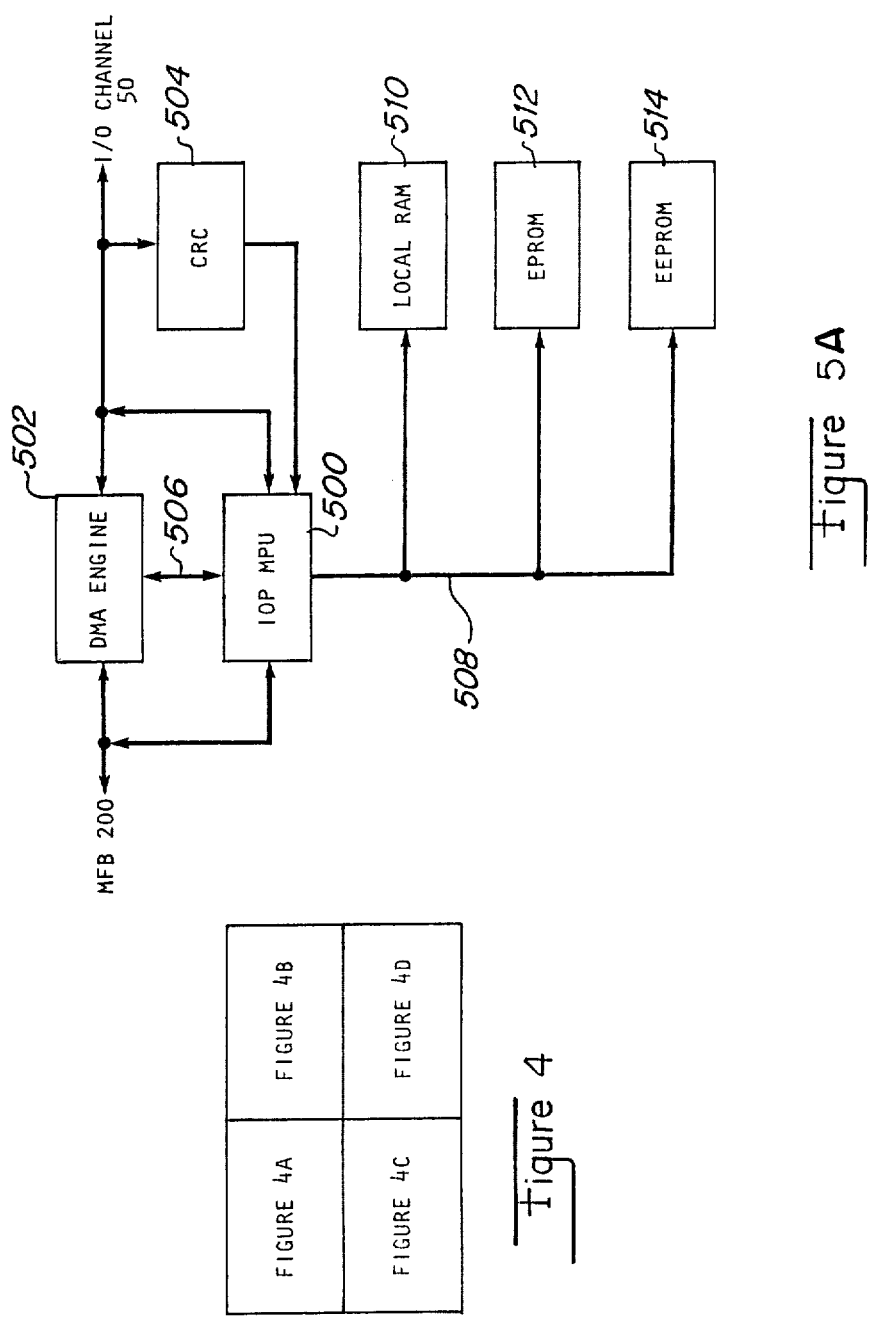
FIGS. 5a-5b shows in schematic block diagram form the I/O processor (IOP) of the SBB, and the flow diagram for the associated control program, respectively.

Referring now to FIG. 4, the UPU 220 can be better appreciated. The UPU 220 comprises a CPU 400, which may for example be either a National 32032 processor or alternatively a National 32016 processor, together with a memory management unit (MMU) 402, and a floating point arithmetic unit (FPU) 404. The MMU 402 may be a National 32082 device, and the FPU 404 may be a National 32081. A timing control unit 406, also part of the National 32000 chip set, provides timing signals to the CPU 400, MMU 402 and FPU 404, each of which communicates via a bidirectional main bus 408. The main bus 408 also connects the various specialized processors 400-404 to address latches 410 and a bidirectional data buffer 412.

The output of the address latch 410 is provided on a latch address bus 414 to variety of locations. The latch 410 provides address information to a control decoder 416, a parity enable mux 418, and a bus enable gating logic 420. In addition, the latch address bus 414 communicates data from the address latches 410 to MFB address buffers 422, error latches 424, CIO 426, and address parity generator/checker 428. The MFB address buffers 422 in turn supply address information to the MFB 200.

Further, the bus 414 supplies address data to a TAG RAM 430, a TAG data buffer 432, a TAG hit comparator 434, a TAG parity generator 436, flush counter decode logic 438, a flush counter 440, and a cache data parity RAM 442. Finally, the bus 414 supplies address data to the cache data RAM 444.

The bus enable gating logic 420 provides gating signals on an eight bit gating bus 450 to cache bus enable logic 452, error latch enabling logic 454, and demux buffer gating logic 456. The cache bus enable logic provides its output on a cache bus 458 to a cache RAM bus enable latch 460, a cache MFB latch 462, and cache parity generator and enabling logic 464. The logic 464 in turn provides a gating output to the cache data parity RAM 442.

The TAG RAM 430 communicates via a bidirectional eleven bit TAG bus 466, by which the RAM 430 receives TAG data from the TAG data buffer 432. The TAG bus 466 may also provide data to the TAG hit comparator 434 and a TAG parity checker 468.

Turning to the data side of the UPU 220, the data bus buffer 412, which communicates bidirectionally with the CPU 400 and related portions of the chip set by means of the bus 408, also communicates bidirectionally with the remainder of the data logic portion of the UPU by means of a 32 bit data bus 470. Although a 32 bit bus is described, if a CPU using other than 32 bits is chosen for the specific implementation, it will be appreciated by those skilled in the art that the change in processor will require corresponding changes in bus structure.

The 32-bit error latch 424 receives address and related information from the bus 414, and receives a HIT control signal from the TAG Hit comparator 434. In the event of an error, the contents of the error latch are read onto the bus 470 by a control signal from the error latch 454. The data bus 470 also communicates bidirectionally with the CIO 426, as well as a 64-bit wide demux buffer 472. In addition, the data bus supplies information to a cache data latch 474, a cache enable latch 476, a flush latch 478, a global status latch 480, conventional data parity logic 482 and a parity enable latch 483. In addition, the data bus 470 supplies three bits to an EEPROM latch 484, which in turn address a diagnostics EEPROM 486. The EEPROM 486 in turn supplies its output back to the bus 470. The cache data latch 474 enables data to be placed in the cache. The cache enable latch 476 turns the cache on and off. parity enable latch 483 turns parity generation and detection on and off.

The cache data latch 474, cache enable latch 476, flush enable latch 478 and parity enable latch 483 provides status information to the CIO 426, and additionally the CIO 426 receives interrupts from the remainder of the system, to which it responds by sending an interrupt acknowledge and asserting a vector on the data bus 470. The CIO 426 also includes time of day counters.

The demux buffers 472 and the cache data RAM 444 both connect bidirectionally to a transmit data bus 488, which in turn communicates bidirectionally with MFB data buffers 490. The MFB data buffers 490 in turn communicate data information bidirectionally with the MFB 200.

The operation of the UPU, given the foregoing description, is believed to be apparent to those skilled in the art. Nevertheless, to assist in understanding the following description of software operation, the operation of the UPU will be briefly described. The processors 400, 402 or 404 may request data in the conventional manner along the bus 408. If the data is in cache, the information will be supplied to the requesting processor. If the data is not in the cache, the request is made to the remainder of the SBB, and particularly the main memory. Once obtained, the data is supplied to the requesting processor through the MFB data bus 488, demux buffers 472, and onward via the bus 470 to the data bus buffers 412 and the bus 408. Simultaneously with providing the information to the requesting processor, the data will be stored in the cache RAM 444, in what is referred to as a READ MISS. During a write operation to an address in main memory 250 by any of the elements in the SBB, the cache will be updated if the above address is stored in the TAG RAM 430 from any previous operation. This is referred to as a WRITE HIT. Parity is preferably also read and stored in the above operation As an alternative to updating the UPU cache 444 by writing the information, the UPU cache 444 may be updated by performing a validate/invalidate operation.

Data received by the UPU 220 from the MFB 200 will be received by the MFB buffers 490, from which it will be sent to the demux buffers 472 by means of the bus 488, and onward as described above. Occasionally it will be appropriate to set known data into the cache RAM 444, in which case the "flush" features described above may be utilized. Other functional aspects of the UPU will be appreciated from the discussion of the process software discussed hereinafter.

Figure 5B:
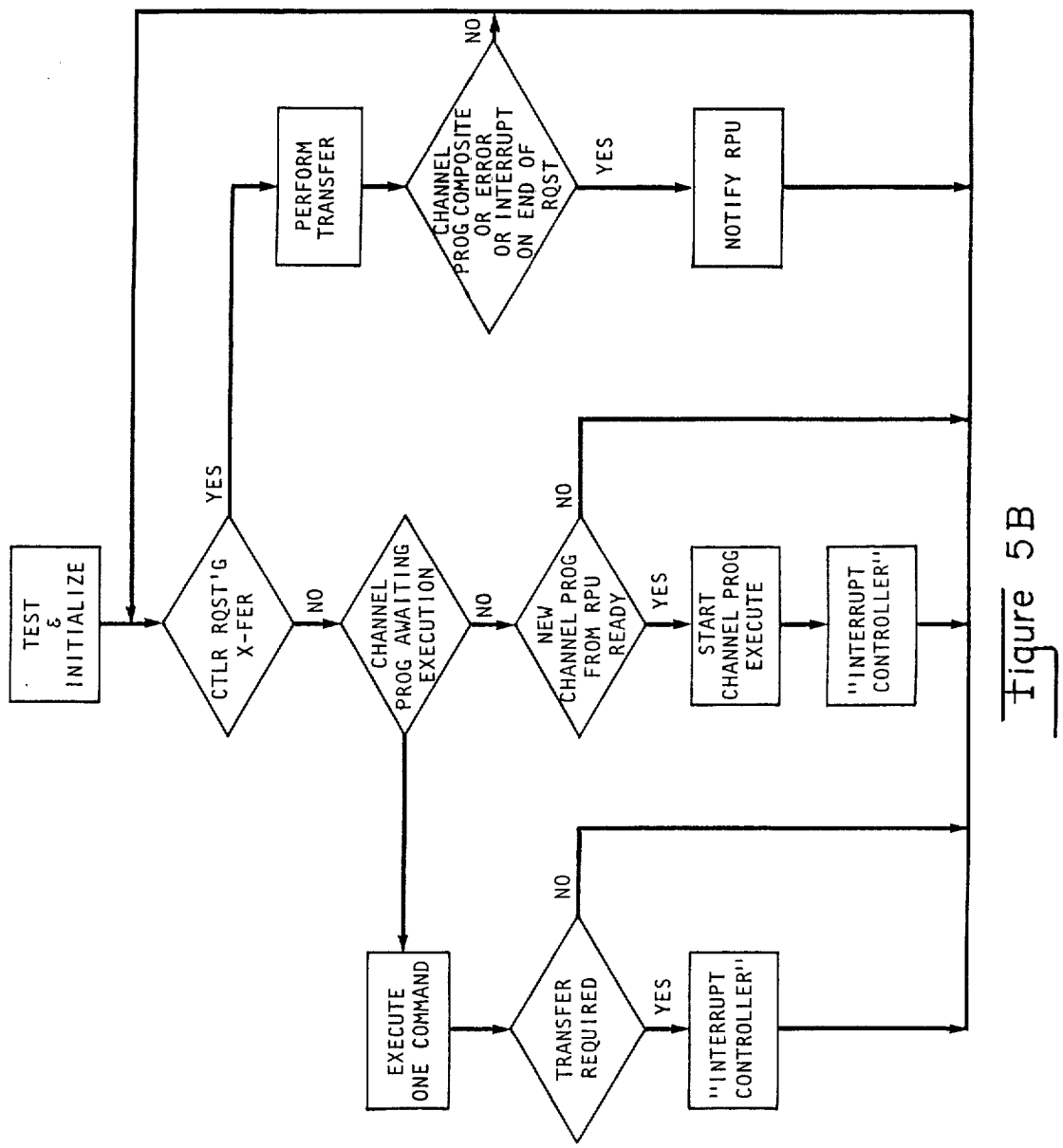
Figure 6A:
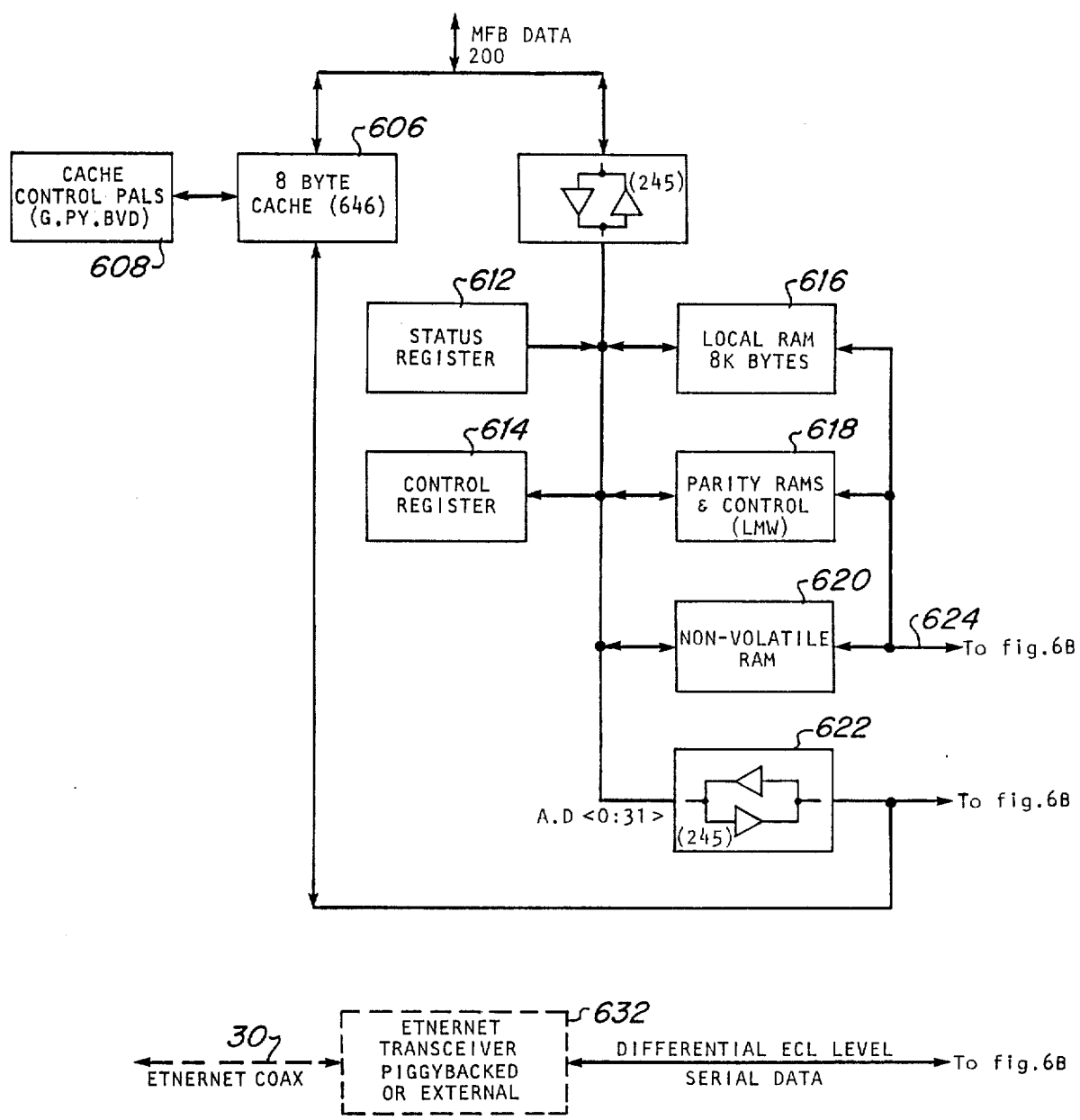
FIG. 6 and 6a, 6b schematic block diagram form the System Interconnect Board (SIB) of the SBB.
Figure 6B:
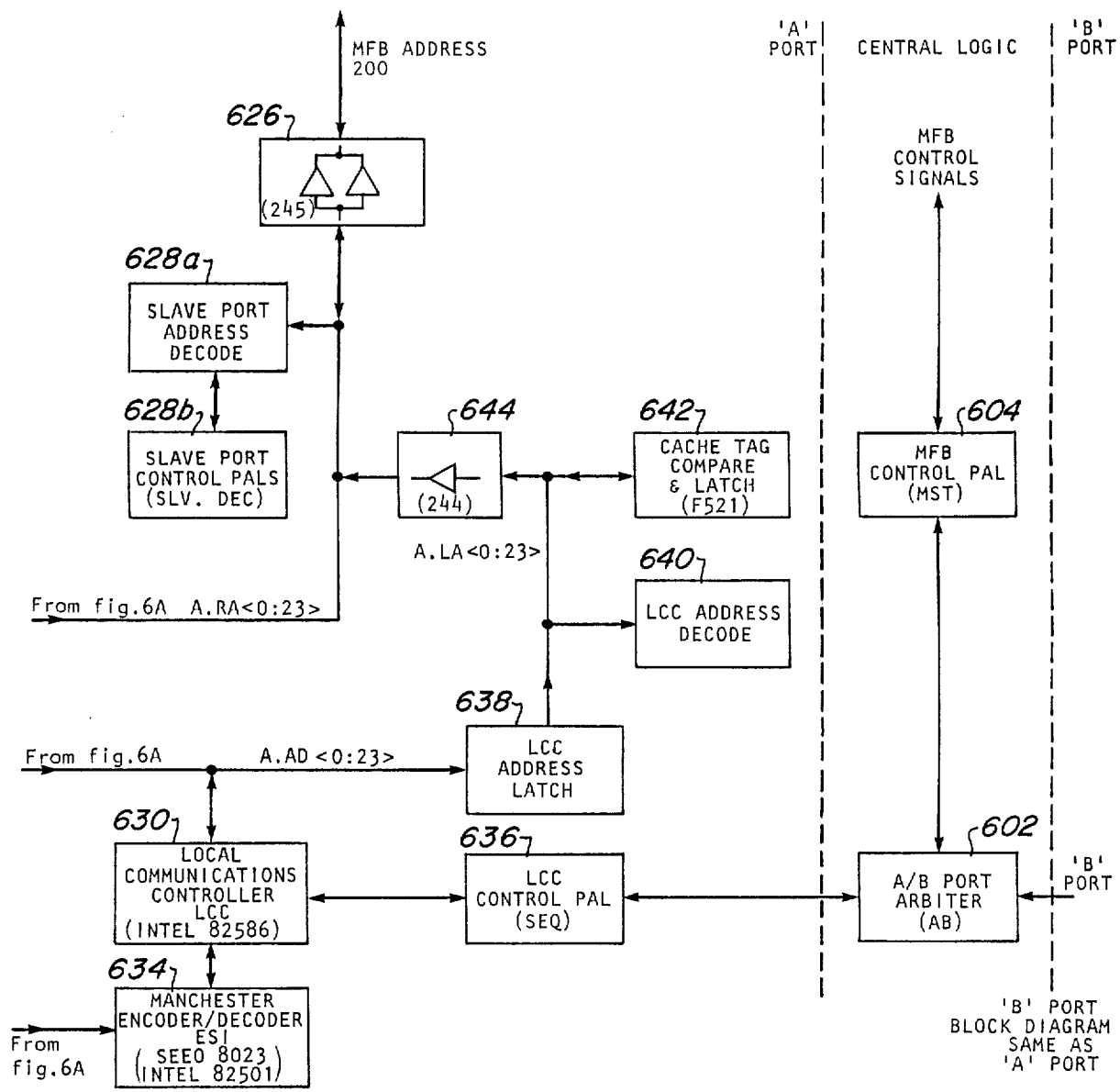

Referring to FIG. 5a, the IOP 230 of FIG. 2 is shown in schematic block diagram form. As noted previously, FIG. 5 is simplified by eliminating conventional signals and to thereby more clearly convey the features relevant to the present invention. An IOP MPU and associated timing control unit 500, which may for example be the National 32016 microprocessor and 32201 TCU, is configured in parallel with a DMA engine 502. The IOP MPU and DMA engine each communicate bidirectionally with the MFB 200 and I/O channel 50. A conventional CRC generator and checker logic 504 is also connected for communications between the I/O channel 50 and the IOP MPU 500. In addition, the IOP MPU 500 and DMA engine 502 may communicate directly by means of a line 506.

The processor 500 communicates with the remainder of the IOP 230 by means of a bidirectional address/data bus 508. The bus 508 communicates with local RAM 510, an EPROM array 512, and an EEPROM array 514 containing diagnostic information for the IOP 230.

The IOP MPU 500 executes firmware instructions stored in the EPROM 512, which may be on the order of thirty-two Kbytes. The local RAM 510 provides internal data storage as may be required by the firmware.

The general operation of the IOP 230 can be understood from the firmware flow diagram shown in FIG.

5b. Normal IOP activities are initiated by the RPU 210, including self-test and initialization (as previously noted in connection with FIG. 2.) In the event a controller is requesting to transfer information, the IOP control program will branch to perform the transfer.

In the event no controller is seeking a data transfer, the control program will check to determine whether a channel program is awaiting execution. The RPU 210 creates a channel program for execution by the IOP 230. The channel program may contain one or more transfer commands, any of which may call for a transfer in either direction between the main memory (via the MFB) and a controller connected to the I/O Channel. If a channel program is awaiting execution, the control program branches to execute the program one command at a time. Depending on whether the channel program requires transfer, the control program will interrupt the associated controller if required or will loop back to restart.

If no channel program is awaiting execution, the control program will check to see if a new channel program from the RPU is ready. If no channel program is, the program will loop to start. If, however, there is a channel program ready from the RPU, the channel program will start execution and interrupt the appropriate controller. The controller initiates all transfers other than interrupts, and so the controller responds with a transfer request and the IOP processor 500 sends control information letting the controller know a channel program destined for that controller is executing.

The IOP MPU 500 then proceeds with execution of channel program commands. When a command requires a transfer, the controller is again interrupted.

When a transfer of data or a block of control information generated by the RPU is required, the IOP control program starts the DMA logic to execute the transfer rapidly. The IOP MPU 500 transfers single sixteen bit words of control information from the IOP 230 to and from the controller. The last command in a channel program always causes a control transfer that lets the controller know the channel program is complete. After the transfer, the IOP 230 notifies the RPU that the channel program is complete.

The transfer command in a channel program specifies the main memory location and the length of the transfer. Several locations and lengths can be chained into a single transfer, which is performed by the IOP MPU 500. The IOP MPU 500 starts the DMA engine 502 for each piece, and the engine 502 stops at the end of that piece.

For transfers controlled by the DMA engine a CRC is accumulated by the IOP MPU 500 and the controller. At the end of the transfer the IOP MPU 500 reads the CRC accumulated by the controller and compare to the one accumulated by the IOP to check for errors.

The RPU can command the IOP 230 to perform a number of channel programs concurrently. Multiple channel programs for a single controller also can be executed concurrently. Each transfer includes an identifier that informs the controller of the channel program to which it pertains. A controller can initiate a transfer if required, such as when a disk is taken off line. In such an instance, the disk controller will initiate a program to notify the relevant SBB. In such cases, the IOP MPU 500 passes the information on to the RPU.

Figure 6:
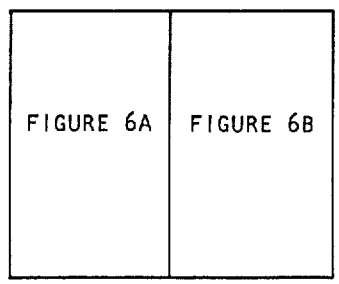

Reference is now made to FIG. 6, which shows the System Interconnect Board (SIB) 240 in greater detail. The SIB 240 provides the interface between the MFB 200 and two conventional LAN cables 232 and 234. The SIB 240 contains two distinct but identical units 600, only one of which is shown in full in FIG. 6, which interface to two independent LAN links 30 and 40. Common arbitration logic comprising port arbiter logic 602 and MFB Control PAL 604 determine which of the units 600 will be used for communication in a particular instance. Each unit 600 preferably is designed for compatibility with the IEEE 802.3 standard, but may be altered for compatibility with other types of Ethernet devices without departing from the invention.

Each unit 600 may be accessed from either the RPU 210 or the UPU 220 of the associated SBB by means of the MFB 200, and in the preferred embodiment no local processor is provided for software support. Because of Ethernet requirements, command structures are required to be stored in RAM on the SIB 240, and data blocks are required to begin on 32 bit boundaries.

The SIB transmits and receives data from the MFB 200 through a cache 606 controlled by cache control PALs 608. A latch 610 is connected in parallel with the cache 606. The latch communicates with status and control registers 612 and 614, respectively, as well as local RAM 616, parity RAM 618 and non-volatile RAM 620, and another latch 622. The RAM 616, parity RAM 618 and NVRAM 620 may each receive address information from an address bus 624, which is connected to the MFB 200 through a latch 626. The address bus 624 also supplies information to slave port address decode logic and associated PALs 628a-b.

Information from the latch 622 may be bidirectionally communicated with a Local Communications Controller (LCC) 630, which may for example be an Intel 82586 device; in addition, the LCC 630 may communicate directly and bidirectionally with the cache 606. The LCC in turn communicates bidirectionally with the LAN link 30 through a LAN transceiver 632 and an appropriate encoder/decoder 634. The encoder/decoder may for example use a Manchester encoding technique, as provided by a Seeq 8023 or Intel 82501 device. The LCC 630 communicates bidirectionally with an LCC Control PAL 636, which in turn communicates with the port arbiter logic 602.

Incoming address information received from the LCC 630 may be provided to an LCC address latch 638, and thence to a decoder 640, a cache tag comparator and latch 642, and finally to the MFB through a buffer 644 and the latch 626.

Figure 7A:
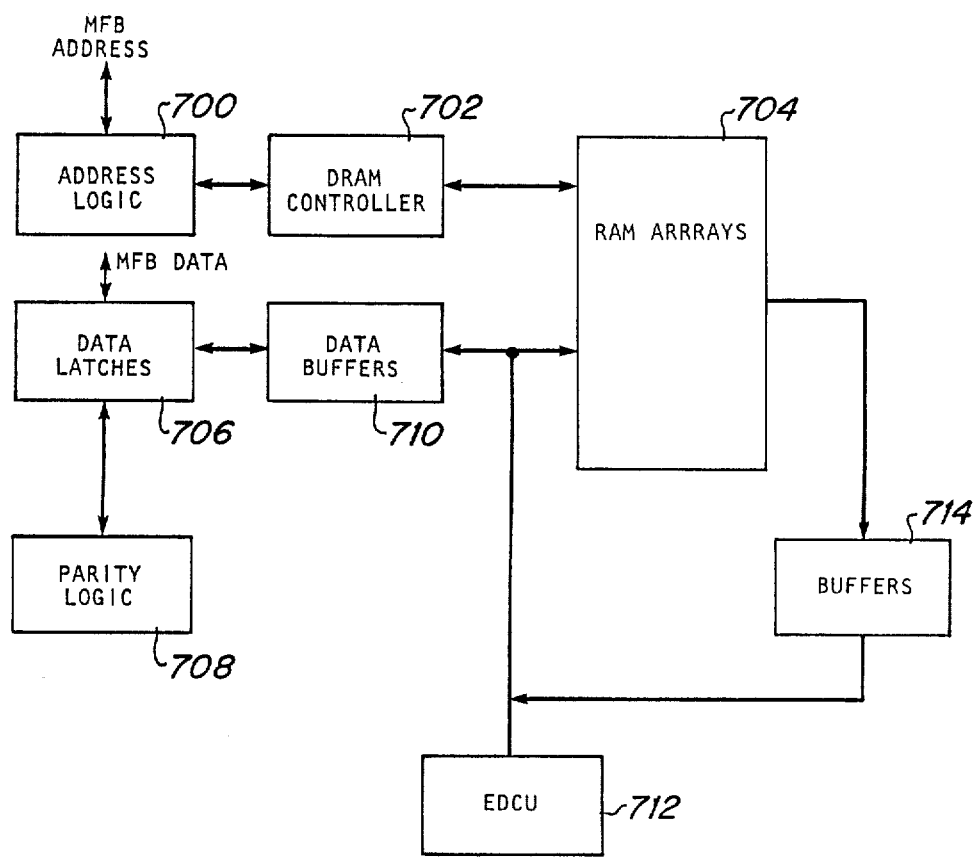
FIGS. 7a-7b show in schematic block diagram form the main memory of the SBB, and the partitioning of the main memory by the operating system, respectively.

Referring now to FIG. 7a, the physical structure of the main memory 250 may be better appreciated. The MFB 200 supplies address information to address logic 700 comprises of appropriate latches, decoders and translator PROMs, which in turn supplies a physical address to a dynamic RAM controller 702 such as an 8207 device. The address information from the DRAM controller 702 is then supplied to a DRAM array 704.

The MFB 200 further communicates data with the memory 250 through bidirectional latches 706, which in turn communicate with parity logic 708, data buffers 710, and error detection and correction logic 712. The error detection and correction logic may for example comprise an array of 8206 devices. The data buffers 710 in turn communicate bidirectionally with the DRAM array 704, which may be any of a wide range of sizes but preferably ranges between four and twelve megabytes. The RRAM array 704, which alternatively could be any of a number of memory devices, supplies outgoing data to a set of data output buffers 714 The output buffers 714 return the outgoing data to the MFB 200 through the buffers 710 and latches 706. The memory 250 is addressable from both the RPU 210 and the UPU 220.

Figure 7B:
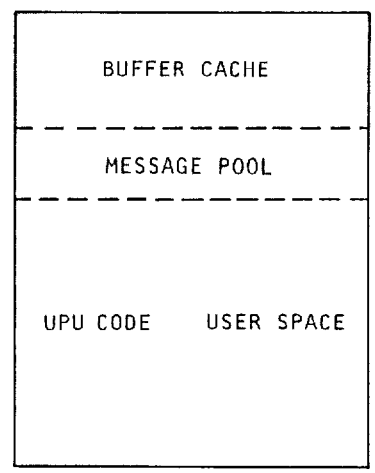

The functional arrangement of the memory 250 may be better appreciated from FIG. 7b, which shows the partitioning of memory required by the system software of the present invention The memory array 720, which is comparable to the physical array 704, is divided into a buffer cache 722, a message pool 724, user space 726 and UPU code 728. It will be appreciated that the RPU control program resides with the local memory in the RPU. Both the RPU 210 and the UPU 220 can address the buffer cache 722 and message pool 724, and these portions of main memory are appropriately locked to avoid collisions as will be explained in greater detail hereinafter.

The size of the buffer cache 722 is entirely defined by the software, and provides a cache storage area for the disks 120–150. The message pool 724 is likewise defined by the memory, and is used to facilitate communications between many of the uniquely named elements of the system, as will be further explained hereinafter.

With the foregoing hardware in mind, it is possible to explain the process related features of the present invention. To more clearly describe these features of the present invention, discussion of other, conventional features is omitted as being apparent to those skilled in the art. It is assumed that those skilled in the art are familiar with a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

To appreciate certain of these features, it is appropriate to describe briefly some of the more common terms used in describing the features of the present invention. The file naming conventions used in the present system will be helpful in understanding system operation. The present invention preferably uses a hierarchical file system similar to that found in Unix, but extended to permit multiple SBBs.

As with conventional Unix, a file system that is online and accessible is described as mounted, but a file system which is unavailable, either temporarily or permanently, is demounted. The operating system of the present invention preferably maintains a list of UIDs, as further discussed hereinafter, for mounted file systems for the entire system in the RPU memory of each SBB, including the owner SBB for that file. Because of the naming conventions, and the list of mounted file systems, a program may access a file on a disk owned by a remote SBB without knowing on which disk of which SBB the file resides. As will be treated further in a discussion of the recovery process, any file system may include an automatic bit, which will cause that file system to automatically be mounted once an SBB takes ownership of the disk on which the file system resides.

File systems are mounted within logical volumes, similar to a Unix disk partition but expanded to permit multiple disks within the logical volume, and multiple mirrored copies, or plexes, of the volume. A logical volume may or may not have a file system mounted within it, but a file system cannot exist without a logical volume. Files exist within file systems, and blocks form portions of a file.

File systems may span multiple disks, or portions of multiple disk drives; a logical volume may map to all or a portion of one or more physical disks. In addition, logical volumes not only may be duplexed, as with conventional fault tolerant systems in the prior art, but may be n-plexed.

Each logical volume includes two parts: a data storage portion, and a log. The log forms a relatively small portion of the logical volume, usually between five and ten percent, and stores, among other things, information concerning transactions being processed by the system, as will be treated in greater detail hereinafter. In addition, for each log a portion of the main memory 250 is set aside as a log buffer; the log buffer forms an adjunct to the buffer cache.

The system of the present invention keeps track of certain key system resources by assigning each such resource an identification unique throughout the system, referred to as a UID. UIDs may be assigned to each communications interface, each disk, each transaction coordinator (further defined hereinafter), each volume, each file system and each file. The use of UIDs to provide systemwide addressing is referred to as the connection system of the present invention.

Each UID comprises, as part of a 64 bit word, twenty-two bits of serial number information for the associated RPU, ten bits of sequence number, and 32 bits of time of day, or timestamp, information. Systemwide uniqueness can be guaranteed so long as the clock does not go backward and processor serial numbers are not duplicated. Sequence numbers are reset every clock tick, and incremented for every new UID assigned.

The next UID to be assigned is maintained in the portion of main memory 250 accessible to both the UPU 220 and the RPU 210. Any UID may have an associated queue which is created by allocating memory and opening the queue. All open UIDs for the entire system are maintained in a table within the main memory 250 of each SBB within the system.

Once a system resource has been assigned a UID, the resource may be uniquely and directly addressed by the message handling system simply by using the resource's UID. The message is then received by the queue of the UID for further processing.

In the event an SBB receives a message directed to a UID that it does not own, that SBB may examine the UID to determine which other SBB does own the UID, and sends a message to that other SBB. For a number of reasons, including failure of the other SBB and recovery by still different SBBs, the receiving SBB may not respond by identifying itself as the owner of the UID. In such an event, the sending SBB sends a message to all of the SBBs seeking to identify the owner of the UID. Once the SBB which is the new owner of the UID is located, the sending SBB will send the message to that owning SBB, which can then process the message. In addition, the sending SBB will enter in its table the new owner of that UID.

In addition to the direct UID addressing described above, indirect UID addressing may be used. In this approach, a plurality of UIDs may be set up to receive messages, and the connection system will simply redirect messages sent to those UIDs to another UID. One use of such indirect UIDs involves file system queue UIDs, or the queue within the message pool to which messages for a particular file system are sent. In the event of a failure of an SBB, as will be discussed in greater detail hereinafter, the connection system deletes the UIDs owned by the failed SBB from the table of open UIDs maintained by the other SBBs remaining in the system. As will also be discussed in greater detail hereinafter, those deleted UIDs will then be reestablished by the recovery system of the present invention.

With the file hierarchy and connection system in mind, the steps in processing a transaction under the present invention may be understood. Transactions are always begun from a user program, which means that transactions always begin in the UPU 220. Each transaction will typically involve several steps, including I/O reads, I/O writes, logging, transaction commit, transaction abort, and interprocess communications. Each of and the UPU 220, as well other portions of the system.

The UPU 220, which is intended primarily for the processing of application code, provides a system call interface, file-system buffer cache search, other synchronous user functions, interprocess communications within a single SBB, and certain low level message and interrupt handling relative to the RPU.

The RPU provides, among other things, multiple execution processes, or threads, by which interrupts can be dispatched from the hardware to higher level software, finding of physical objects within the system, mapping of logical to physical blocks, file system handling including space allocation and volume management, transaction image management, interprocess communications across SBBs, low level message handling, and disk drivers to perform disk I/O's. At least some of these features of the RPU may be provided by the real time executive program (RTE) which runs in the RPU and is the linking software between the system hardware described in FIGS. 1 through 7 and the higher level software, such as application or user level programs.

The processes included within the RPU which may be requested by the operating system include a transaction manager (TM) process, sometimes referred to herein as the transaction coordinator, one or more I/O servers (IO), and an asynchronous server (ASC) for completion of asynchronous I/Os. The RTE also permits the process to be suspended ("put to sleep") or resurrected ("awakened") at appropriate times during processing as required by the remainder of the system. When a process is suspended the RPU 210 and RTE perform other operations.

The relationship between system software and user software operating in the UPU 220 and RPU 210, and their interaction during the processing of a transaction, may be better appreciated from FIG. 8, which provides a conceptual representation. Within the framework of the UPU 220 in FIG. 8 reside user programs 810 and a portion of the operating system 820, as well as a UPU firmware nucleus. On the side of FIG. 8 representing the RPU 210 reside the RTE nucleus and the RTE processes.

Referring again to FIG. 8, a transaction is always begun from a user program or process. The user process makes a system call referred to as "begin transaction" to the operating system of the UPU. The begin transaction call causes the UPU to automatically develop a kernel data structure for that transaction, which is managed by the transaction coordinator process in the RPU 210.

The transaction coordinator process residing in the RPU 210 notifies each file system relevant to the transaction by sending a message to the RPU of the SBB which owns that file system. Each remote SBB having a relevant file system then establishes local transaction control structures for the related file system. If the application program requires information from or will write information to the file, the file open request may include an attribute to cause a lock to be applied during the transaction.

Under the present invention, locking may be provided at either the file level or the block level. File level locks are automatically applied at file open if requested by the user; use of a special attribute, referred to as the O-Control attribute, is required for block level locking.

Four types of locks may be applied at the file level: an exclusive lock, which provides exclusive read/write access, guarantees reproducibility of reads as well as a consistent view of the file during the transaction, regardless whether the level locks; a shared lock, which provides read-only access and prevents any other process from obtaining either an exclusive or intent exclusive lock on the file, guarantees reproducibility of reads and a consistent view of the file, and is not delayed by any block level lock; an intent exclusive lock, which provides read/write access and prevents any other process from obtaining an exclusive or shared file-level lock, but does not guarantee reproducibility of reads unless the O-Control attribute is set, and is delayed by conflicting block level locks (this is the type of file level lock usually used in on-line transaction processing); and an intent shared lock, which provides read-only access and prevents any other process from obtaining an exclusive file level lock, but does not guarantee consistent reads without the O-Control having been set for block level locking, and is delayed by conflicting block level locks.

Block level locking, obtained by use of the 0-Control attribute, may be of two types: shared, which automatically occurs when the process reads a block and ensures that no other process can obtain an exclusive lock on the block; and exclusive, which occurs when the process writes a block or executes a "read with write lock" system call and guarantees that no other process can obtain either a shared or exclusive lock on the block during the transaction.

If the block being sought is subject to a lock from another process at the time of the request, the second process will be suspended and retried until the block becomes available and the lock is obtained. In some instances, however, it is theoretically possible that deadlock will occur; in such instances, immediate deadlock detection may be provided locally, and resolution of remote deadlocks may be provided by, for example, a timeout to terminate system waits.

Files sought by a transaction can reside either on a local or remote SBB. If the file is local, read and write requests are passed directly to the file manager on the UPU 220. If the requested information is found in the UPU's buffer cache, the information is simply supplied back to the requesting process.

However, if the information is not located in the buffer cache, or is located on a remote SBB, the UPU transmits a request to the RPU 210 to find and deliver the data. If the data is on a remote SBB, the remote SBB's local data structure, set up at the beginning of the transaction, obtains the appropriate locks and sends the information to the requesting SBB. File locks on the remote SBB are treated identically to those on the local SBB, so that any file with the 0-Control attribute will wait until the appropriate level of locking is available.

Once the begin transaction operation has been completed, the transaction is processed as required by the user program. A characteristic portion of an on-line transaction is performing an I/O read. Four types of read operations exist in the system of the present invention, which may be better appreciated from FIGS. 8a–d, respectively.

Figure 8A:
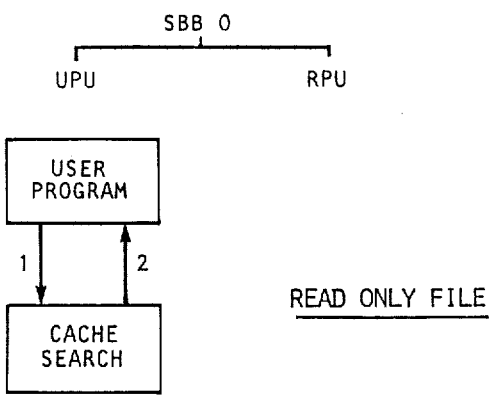
FIGS. 8a, 8b, 8c, 8d show four types of read operations in accordance with the present invention.

In the first type of read operation, shown in FIG. 8a, the desired data is contained in the buffer cache, and no disk access is required. In this type of read, the user program residing in the UPU 220 makes a call (1) to the buffer cache portion of the main memory 250, and locates the data there. The cache then returns (2) the data to the user program directly.

Figure 8B:
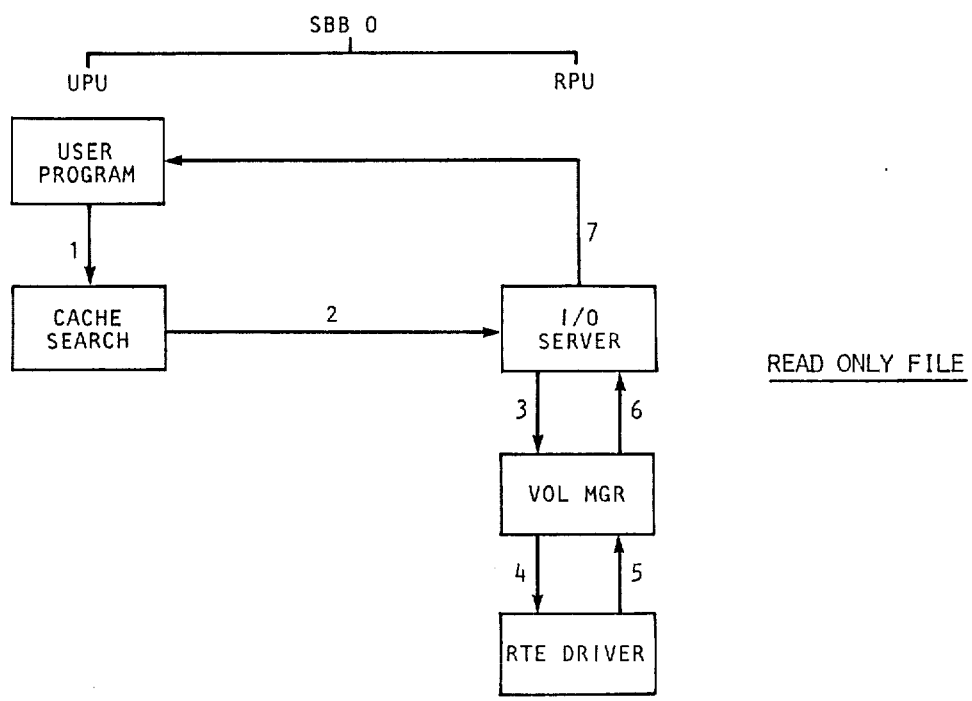

In the second type of read operation, shown in FIG. 8b, the cache does not contain the information, but the file system and disk having the required data is local. In this second type of read operation, the user program running in the UPU again makes a call (1) to search the buffer cache, but there is no cache hit. This causes the UPU 220 to send a message (2) to the I/O server process running in the RPU 210, and the I/O server in turn makes a call (3) to the local volume manager.

The volume manager in turns makes a system call (4) to RTE to cause the data to be retrieved from the local disk. The RTE driver then provides (5) the data to the volume manager, which in turn transmits it (6) to the I/O server. The I/O server then sends a message (7) with the data directly to the user program.

Figure 8C:
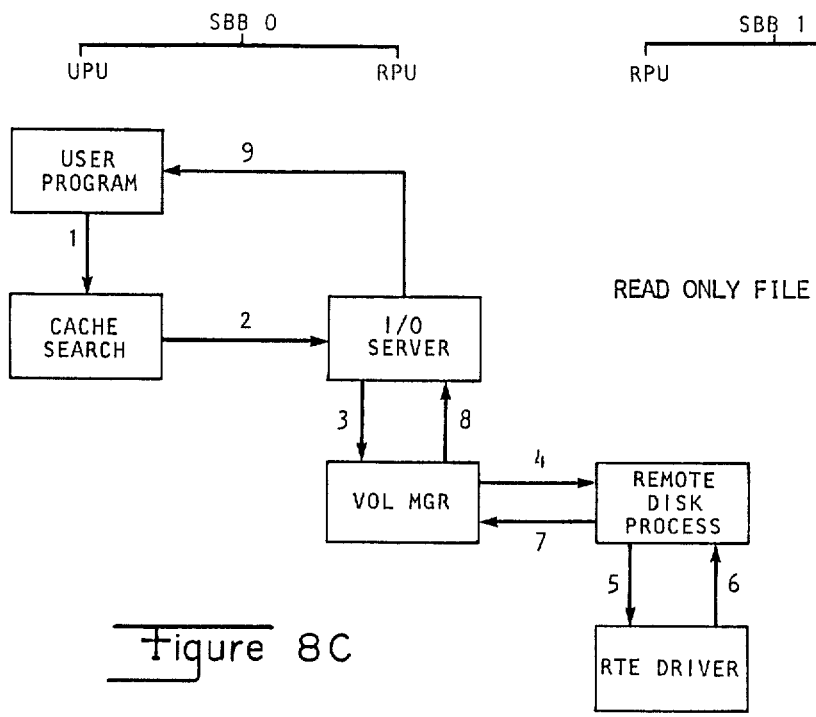

The third type of read operation, shown in FIG. 8c, involves the situation where there is no cache hit, the file server is local, but the disk containing the data is remote. In such an instance the user program makes a call (1) to the cache, which in a "cache miss" sends a message (2) to an I/O server of the RPU. The I/O server then calls (3) the local volume manager, but the volume manager determines the disk having the data is not local.

The volume manager then sends a message (4) to the remote disk server process running in the RPU of the SBB identified by the UID as owning the disk having the data. The disk server process then makes a call (5) to the RTE drivers in the same manner as FIG. 8b, and the data is returned (6) to the disk process. The disk process sends a message (7) containing the data back to the volume manager, which responds (8) to the associated I/O server. The I/O server then sends a message (9) with the data back to the user program directly.

The first three types of read operation are useable only when the file is a read only file, or when the file, though not read only, has not been written to by any other SBB in the system. The fourth type of read operation may be used for read only files, read/write files, and files opened with the O-Control attribute for either reading or writing.

Figure 8D:
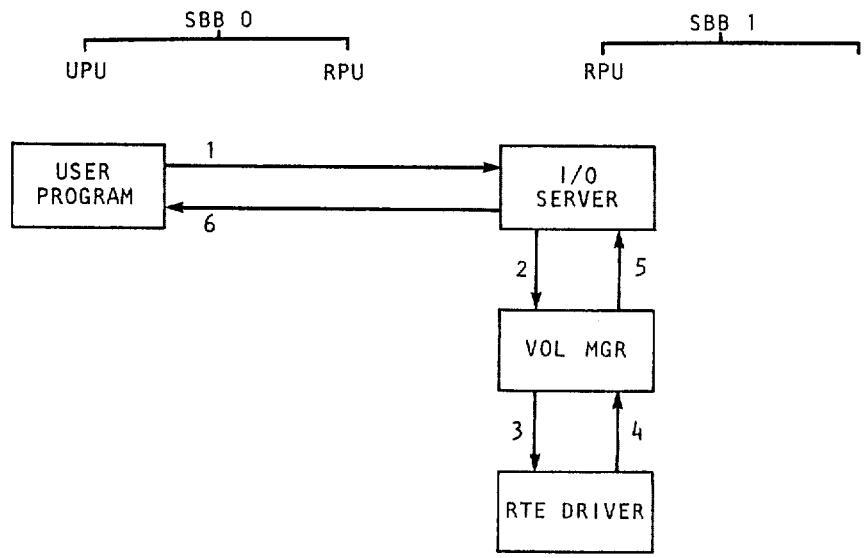

The fourth type of read, shown in FIG. 8d, involves a local user program, a remote file system, no cache hit, but with the file system residing on the same SBB as the disk. This example also has application to file opens using the O-Control attribute, or to file writes, discussed hereinafter.

In this fourth type of read operation, the operating system associated with the user program directly sends a message (1) to the I/O server of the remote RPU, and that remote I/O server makes a system call (2) to the local volume manager. The volume manager makes a system call (3) to the RTE drivers just as with the other types of read, and the information is provided back (4) to the volume manager. As before, the volume manager returns (5) the data to the I/O server. The remote I/O server then sends a message (6) directly to the operating system and then the user program.

It will also be appreciated that the steps described for the process shown in FIG. 8d may incorporate steps from FIGS. 8a–c as permitted by the state of the data.

A review of FIGS. 8c and 8d will make apparent that the system of the present invention is capable of dealing with two levels of remoteness. The first level of remoteness occurs at a high level and involves a remote I/O server, such as shown in FIG. 8d, whereas the second level of remoteness occurs on the lower disk level and operates through the volume manager to access remote disks. It will also be appreciated from the foregoing diagrams that I/O servers always call local volume managers, but the volume manager determines whether the disk itself is local or remote. If the disk is local, the volume manager calls RTE; if remote, the volume manager sends a message to the remote disk server. The volume manager and remote disk server both always run on the RPU.

In the read operations shown in FIGS. 8a–8d, no locking step has been described for the sake of simplicity; however, the locking will occur a step 1, just before the call to cache (FIGS. 8a–8c) or the I/O server (FIG. 8d). The I/O server process for each relevant file system executes the locks as required. In the event the proper level of locking is not readily available, the lock request waits in a lock queue until any transaction having conflicting locks on the files or blocks releases those locks. The I/O server reexamines the lock queue upon completion of a transaction and release of the locks, but until then remains available to perform other tasks.

It will be appreciated that, while only one RTE driver has been shown in FIGS. 8a–d, which is representative of only a single plex, there may be several plexes and in a fault tolerant configuration would be at least two plexes. Such a configuration simply requires a straightforward expansion of the steps involving communication with the RTE drivers.

Another common function within a transaction is the I/O Write, which bears considerable similarity to the I/O Read described above, but requires somewhat different locking and logging to ensure data consistency. As with the I/O read, the function begins with the user process sending a message to the I/O server by means of the FSQUID. The I/O server calls the lock manager, but requests an exclusive lock on the block. After any pending transactions having that block locked are resolved, the lock manager returns the exclusive lock.

At this point, the current data is queued up in the log buffer as a pre-image to be written or flushed to a log in the logical volume once a caravan of one or more pre-images or other information plus header and trailer have been received. The caravan may be written out to the log if required by the transaction coordinator, or if the pre-image must be written to the disk to maintain consistency, or if the caravan is full. The header includes the UID of the coordinator, and also includes various pointers.

The pre-image is written in blocks of 1 KBytes, since the records being written are typically less than 1KB. Of course, if the pre-image already exists in buffer cache, the image is not read from the disk but is treated as described in connection with FIG. 4.

The new, or altered, data is stored in the buffer cache and flagged to indicate that it needs to be written to disk. Periodically, the I/O server will invoke the volume manager to actually write out the block, either at the completion of a transaction or to reclaim buffer cache memory. Prior to writing the block, the log buffer is examined to see if a pre-image for the block has been placed in the log buffer but not yet written to the log. If so, that log buffer is first written to the log under the control of the volume manager invoking RTE.

If the disk on which the data is to be written is local, the volume manager makes a direct call to the RTE of the RPU and bypasses the disk server. However, if the disk is remote, the volume manager sends to the disk server with the data, and the disk server makes a call to the RTE of the remote SBB with the data. The related IOP then performs a conventional write to disk through the disk controller, and returns an acknowledge to the volume manager and thence to the I/O server. The I/O server in turn sends an acknowledge to the user process. The buffer cache flag indicating that the block needs to be written is reset.

In some instances, the full transaction will not complete, due to deadlock or a hardware or software failure. In such an instance, a fault tolerant machine will preferably prevent corruption of the data. Since an abort may occur at any time during a transaction, it could occur after a write to disk has been performed. In this circumstance, it is necessary to restore the file to its state prior to the write to avoid corruption of the data. In such cases, the pre-image stored in the log is critical.

To prevent corruption of the data due to an abort following a disk write, the pre-image is maintained in the log at least until a function referred to as Transaction Commit has occurred, or until a Transaction Abort has occurred. Since the transaction will successfully complete in most instances, the Transaction Commit process will be described first.

The commit process of the present invention implements what is generally referred to as a two-phase commit. Phase 1 begins when the user process executes the commit transaction system call. At the time the user process requests the commit, the transaction coordinator sends commit messages to the FSQUIDs of each of the file systems involved in the transaction, or any file system to which a read or write has been directed since the begin transaction system call. The messages are received by the I/O servers, which then, in the case of a write to the associated file, flush the pre-image to the log and the post-image to the data file.

Once the I/O server has written to disk all pre-images and data blocks (if not already flushed), it sends an acknowledge (ACK) as previously described. When all relevant I/O servers have responded, the transaction enters phase 2 of the commit process. Alternatively, if any I/O server is unable to cause the write to be performed, it responds with a negative acknowledge or NACK, and the transaction enters the abort procedure.

During phase 2 of the commit process, after all the ACK responses have been received from the I/O servers, the transaction coordinator synchronously writes to a portion of the log referred to as the coordinator log. The write to the coordinator log commits the transaction. The coordinator log is always retained on the logical volume log of the local root of the SBB on which the coordinator resides.

Because of plexed volumes, it will be appreciated that the coordinator log is also plexed, and may be spread over multiple physical disks. Thus, the synchronous write by the transaction coordinator may actually involve writes to multiple disk files, but the first disk file to receive a commit will no longer be able to restore the pre-image. For this reason, a transaction is considered committed if the transaction coordinator writes to only one coordinator log.

Of course, in nearly all instances the transaction coordinator will successfully write to each plex of the coordinator log. In such an instance, the transaction coordinator responds to the earlier ACK messages from the relevant I/O servers notifying them that the transaction is committed, and the I/O servers respond by releasing the locks on their respective blocks of data as well as posting a local commit to their own logs. Once each of the local commit records is successfully written to disk, the I/O servers send another ACK to the transaction coordinator, and the coordinator deallocates the transaction control structure initiated at the beginning of the transaction.

A form of system communications closely related to the reads and writes described above is interprocess communication channels, or IPC channels. IPC channels are similar to 4.2 BSD sockets, but provide greater flexibility and ease of use in that an IPC channel in accordance with the present invention, once created, may be opened like an ordinary file. Further, reading and writing may be done in either stream or message mode, and may be used with the open, close, read and write system calls of the present invention, including normal file-access protection mechanisms.

IPC channels as provided by the current invention provide improved throughput when data accesses are distributed throughout the system and the number of data base accesses made by the server is greater than the number of interactions between the client and server, because they permit a server process to run on the SBB that owns the data of interest, rather than on the SBB making a request for data to a remote SBB.

IPC channels may be established between clients and servers, where a client is typically regarded as the part of the transaction processing application that handles interaction with the terminal and the server handles interaction with the data base. In addition, IPC channels may be established in accordance with the present invention between peer processes. IPC channels may be defined as read-only, write-only, or read-write, and are preferably although not necessarily matched read-only to write-only and read-write to read-write.

Establishment of an IPC channel requires two steps: first, identifying the appropriate UID for the IPC channel, and second, matching system open calls between client and server, peer and peer, or peer and server. Two UIDs, one at each end, are required to define the IPC channel. Typically, servers wait for clients to open the IPC channel. In addition, IPC channels opened for transaction processing with the O-control attribute are preferably only paired with another process which opens the IPC channel with the 0-control flag set, and vice versa.

Figure 9A:
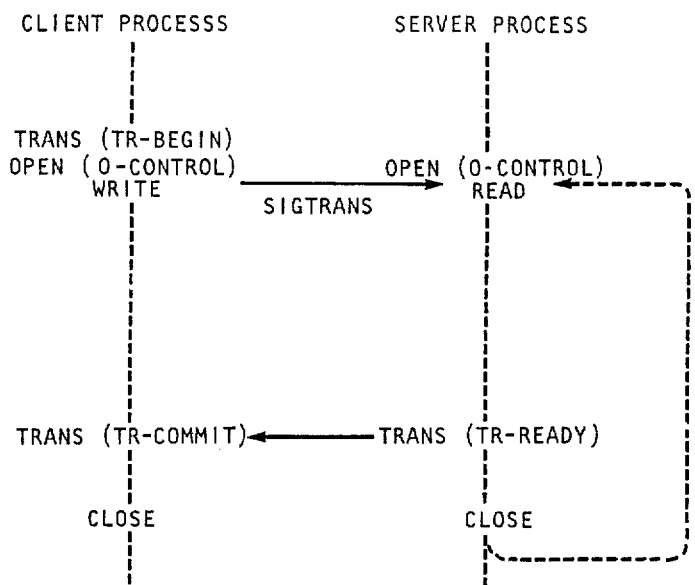
FIGS. 9a, 9b, 9c conceptually depicts three types of interprocess communications channels.
Figure 9B:
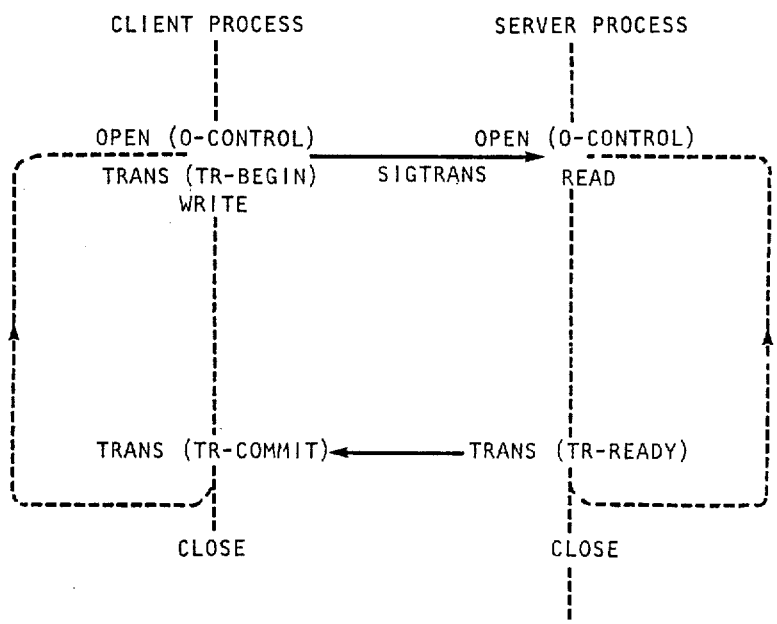
Figure 9C:
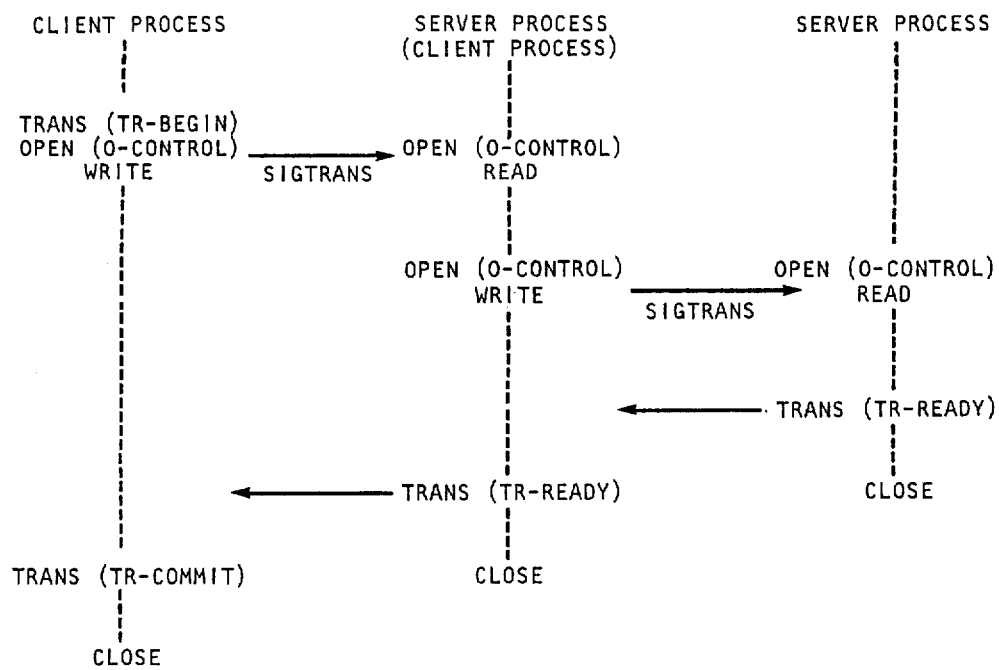

IPC channels may be established as either temporary or permanent connections for purposes of transaction processing, and also may include nested transactions, all as shown in FIGS. 9a-9c.

With reference first to FIG. 9a, the temporary connection arrangement is shown. The temporary connection model permits the channel to work with a plurality of client processes, whereas the permanent connection arrangement permits only a single client.

In the temporary connection arrangement of FIG. 9a, the client process begins the connection with the transaction begin call, just as described in connection with FIG. 8, followed by a file system open call using the O-control attribute. When the server also places a file system open call using the O-control attribute, a signal is sent to the server identifying the establishment of the channel. The transaction then starts with the server performing a read on the IPC channel and blocking the channel until the client performs a write. This "read-write" establishes synchronization for the client and server, after which the body of the transaction may be executed.

When the server completes its part of the transaction, it executes a "transaction ready" call, asynchronously closes the IPC channel At the close of the transaction, and loops to the top of the program to reopen the IPC channel for another client. The server would not be signaled if an abort should occur subsequently in the original transaction. Alternatively, the server may remain in transaction mode by blocking on a read call until a write call is issued by the client to signal that the transaction has committed. In either event, the client will close following transaction commit.

The permanent connection model of FIG. 9b differs from that of FIG. 9a only in that the file system open and close calls occur outside of the range of the loop, and the client also includes a loop to the transaction begin call. It will be apparent that this arrangement keeps the client and server processes continuously communicating.

With reference to FIG. 9c, it will be apparent that a process may be a server with respect to part of a transaction, but a client with respect to another part of that transaction. It will also be apparent that the secondary client-server process includes slight adjustment of the timing of the system open calls with the O-control attribute.

Having described the successful processing of transactions in accordance with the novel features of the present invention, it is also appropriate to discuss failure of a transaction to complete and the recovery procedure which returns the data to a consistent state.

If the transaction aborts, the failure can be the result of many causes. However, failures may generally be grouped transaction coordinator survives but the file system is lost; and those in which the transaction coordinator does not survive but the file system survives.

In the first class, the circumstance where an abort occurs but the transaction coordinator is surviving, the coordinator sends messages to each of the I/O servers that transaction is to be aborted. The I/O servers then read the pre-images of each of their respective blocks from the log record (either buffer cache or log ) and write them to the data file, which restores the data to its condition before the transaction began. The I/O servers then release their locks on their associated blocks, and send ACKs to the transaction coordinator. In addition, the transaction coordinator gives notice to the user process (or application software) that the transaction has failed, which permits the user program to determine whether to restart the transaction or take other action.

In the second case, in which a file system volume manager is lost, as may happen, for example, if its SBB crashes, a backup volume manager residing in another SBB will notice and will initiate the mount process. The other volume managers will notice because of the status monitoring performed continuously by the remaining SBBs. The status monitoring depends on the regular receipt of normal, operation-related messages; in the event an SBB has not received a message from another SBB for an unusually long period, the SBB will generate an artificial message to the suspect SBB, and if no response is received will conclude the suspect SBB has failed. This causes a new logical volume to be selected in accordance with any of several known protocols.

The purpose of the mount process is to place the file system in a consistent state prior to the file system coming on line; the mount process invokes this procedure each time it is called for a file system, including initial mounting. The user can designate, when configuring logical volumes, a primary and a secondary SBB coordinator; if none is selected by the user, a default path is assigned based on access to the volume. The local root file system will have its automount bit set, and so will be automatically mounted when the backup volume manager takes over.

The mount process scans the entire active portion of the log and identifies each pre-image for which no transaction commit exists. For each pre-image for which no commit exists, the mount process determines the UID of the related transaction coordinator from the header of the message incorporating the pre-image, and sends a message to that coordinator to determine whether the transaction was committed or aborted. The transaction coordinator, which is required to be locally managed and still has the control structure, recognizes the transaction and sends back a message to either commit or abort. For each aborted transaction, the pre-images are applied to the data file as described above; for each committed transaction, the log is modified to indicate that the transaction was committed. At this point, the file system is consistent, and comes on line, at which time the user process can restart.

The third class of aborts involves a failure which causes the transaction coordinator to be lost, such as a failure of that SBB. In such an instance, the transaction coordinator will typically not advise the I/O servers to apply the pre image, but another SBB will learn of the failure through failure to respond to a data request, or loss of the required periodic signal.

Regardless of how the failure is determined, the takeover of the transaction coordinator is initiated by the volume manager as part of the mount process for the logical volume containing the coordinator log. The mount process encounters a record describing the coordinator log for the failed SBB, and creates a temporary coordinator under the UID of the old coordinator so that it will receive all messages previously sent to the old transaction coordinator. It will be appreciated that it is also possible for the coordinator to restart on the original SBB.

The mount process then scans the coordinator log, and creates transaction control blocks in the manner described previously for each transaction which the coordinator log shows has committed. The backup coordinator then aborts all other transactions in the manner previously described, causing the file system to become consistent.

In some instances, a mount process of another file system will begin before the temporary coordinator is established. In such instances, the mount process simply queries the UID, does not get an answer, times out, and recycles and retries until the backup coordinator is established and begins sending messages.

By providing recovery from failures of a remote SBB as well as a local SBB, it can be appreciated that any single system hardware failure of an appropriately configured system will not cause corruption of the data or cessation of processing by the system as a whole. More simply put, the invention described herein can be seen to be an on line transaction processing system having the attributes of fault tolerant, including continuous availability and data integrity, ease of use and expandability.

Having described a preferred embodiment of the invention, it will be appreciated by those skilled in the art that there exist numerous alternatives and equivalents which do not depart from the invention. Therefore it is intended that the scope of the invention not be limited by the foregoing description, but only by the appended claims.

We claim:

1. A distributed processing system comprising: a plurality of processing units,
   - a plurality of interprocessor communications links each extending from each processing unit to each other processing unit,
   - each processing unit including a plurality of interprocessor communications links, a real time processor, an applications program processor, a local memory and at least one I/O processor each connected by a bus internal to the unit and separate from an I/O channel, wherein the real time processor controls access to the internal bus by the remaining portions of the processing unit,
   - a plurality of I/O channels, one connected to each I/O processor included within each processing unit, and
   - a plurality of communications processors having at least two ports, each port being connected to an I/O channel associated with a different processing unit, and adapted to connect to a plurality of I/O devices,
   - a plurality of disk controllers connected to each I/O channel, a plurality of disks each having at least two ports and configured to have a first port connected to a disk controller associated with an I/O channel connected to a first processing unit and a second port connected to a disk controller associated with an I/O channel connected to a second processing unit, and further configured to be addressable by only one of said disk controllers at a time,
   - each processor being associated with at least a key one of said disks which said processor is capable of addressing and each such key disk being configured to store a log-containing transaction information associated with the associated processing unit, and
   - at least one of said processing units being capable of recognizing the failure of another processing unit, examining the transaction information contained in the log stored on the associated disk, and establishing control of that associated disk.

2. A method for fault tolerant transaction processing comprising the steps of
   - establishing an association between each of a plurality of processing units and at least one non-volatile storage media having at least two ports, whereby only one processing unit is allowed to address the associated at least one non-volatile storage media so long as the processing unit continues to operate and does not relinquish control of the at least one non-volatile storage media,
   - storing information concerning status of transactions coordinated by each processing unit in a log on the associated at least one non-volatile storage media,
   - interconnecting the plurality of processing units through at least one interprocessor communications link,
   - monitoring signals transmitted from time to time from each processing unit to determine whether any of the processing units has failed,
   - permitting a second processing unit to establish communications with the at least one non-volatile storage media formerly associated with a failed processing unit and to examine the transaction information for the transactions formerly coordinated by the failed processing unit, and
   - causing the second processing unit to complete the transactions formerly coordinated by the failed processing unit by committing or aborting those transactions.

3. A method for fault tolerant transaction processing in a processing system having a plurality of processing units, non-volatile memory means for storing a log therein for each processing unit, and interprocessor communications links connecting each of the processing units, the method comprising the steps of
   - creating a log in the non-volatile memory means for each of the processing units;
   - establishing a transaction coordinator in one of the processing units for each transaction processed by the system,
   - recording information developed by the associated transaction coordinator about the associated transaction in the log,
   - detecting the failure of the processing unit wherein the transaction coordinator resides,
   - causing a second processing unit to establish communications with the log associated with the failed processing unit,
   - scanning the log to determine entries which are potentially inconsistent with information stored elsewhere in the system,
   - interrogating other processing units to identify inconsistencies between the log and information stored elsewhere in the system, and
   - committing and aborting transactions in accordance with the actual state of those transactions as necessary to cause the log and the information stored elsewhere to be consistent.

4. Fault tolerant transaction processing apparatus comprising:
   - means coupling each of a plurality of processing units and one non-volatile storage media associated therewith to enable only one processing unit to address the associated at least one non-volatile storage media so long as the processing unit associated therewith continues to operate and does not relinquish control of such at least one non-volatile storage media,
   - each of said non-volatile storage media storing thereon information concerning status of transactions coordinated by the associated processing unit,
   - means including an interprocessor communication link interconnecting the plurality of processing units, means responsive to signals transmitted from each processing unit to determine whether any of the processing units has failed for enabling a second of the plurality of processing units to establish communications with the at least one non-volatile storage media formerly associated with a failed one of the plurality of processing units, and to examine the information stored on such formerly-associated non-volatile storage media concerning status of transactions formerly coordinated by the failed one of the plurality of processing units, and said second processing unit thereby being enabled to coordinate the transactions formerly coordinated by the failed one of said plurality of processing units for completing or aborting those transactions.

5. Fault tolerant transaction processing apparatus including a plurality of processing units and a plurality of non-volatile memory means and including interprocessor communications links coupling each of the plurality of processors, the apparatus comprising:

means operatively coupling each of the processing units an associated non-volatile memory means for storing thereon a log for the processing unit associated therewith;

at least one of the plurality of processing units including transaction coordinating means for each processed transaction;

means for recording in the log of a non-volatile memory information developed by the associated transaction coordinating means about the processed transactions;

means for detecting the failure of a processing unit which the transaction coordinating means for enabling a second one of the plurality of processing units to establish communications with the non-volatile memory means having there the log associated with the failed processing unit;

a file system for storing information about the actual states the processed transactions;

means for scanning the log associated with a processing unit to determine entries of information which are inconsistent with information stored in the file system; and means for interrogating other processing units to identify inconsistencies between the logs associated therewith and information stored in said file system for enabling a processing unit to commit or abort transactions in accordance with the actual state of those transactions as determined by information in the associated log being consistent with information stored in the file system.

6. A method for coordinating fault tolerant transaction processing within a system having a plurality of processing units, an operating system, and a plurality of transaction coordination logs stored within non-volatile memory means, and including interprocessor communications links connecting each of the processing units, the method comprising the stops of:

creating a transaction manager within the operating system for each transaction coordination log;

establishing a transaction manager for each transaction processed by the system;

recording information developed by the transaction manager about a transaction in a transaction coordination log;

detecting a failure of the processing unit on which a transaction manager is executing during a transaction;

creating a backup transaction manager within the operating system for another processing unit;

establishing communications between the backup transaction manager and the transaction coordination log associated with the failed transaction manager;

scanning the transaction coordination log to determine entries are potentially inconsistent with information stored elsewhere in the system;

interrogating other Processing units to identify inconsistencies between the transaction coordination log and information stored elsewhere in the system, and committing and aborting transactions in accordance with the actual state of those transactions as necessary to cause the transaction coordination log and the information stored elsewhere to be consistent.

* * * * *